(12) United States Patent
Morimura et al.

(10) Patent No.: US 9,687,734 B2
(45) Date of Patent: Jun. 27, 2017

(54) GAME SYSTEM

(75) Inventors: Naoya Morimura, Kyoto (JP);
Hirofumi Matsuoka, Tokyo (JP)

(73) Assignees: Nintendo Co., Ltd., Kyoto (JP);
Creatures Inc., Tokyo (JP)

( * ) Notice: Subject to any disclaimer, the term of this patent is extended or adjusted under 35 U.S.C. 154(b) by 2378 days.

(21) Appl. No.: 12/367,732

(22) Filed: Feb. 9, 2009

(65) Prior Publication Data
US 2009/0264172 A1   Oct. 22, 2009

(30) Foreign Application Priority Data

Apr. 16, 2008   (JP) ................................. 2008-106443

(51) Int. Cl.
| | |
|---|---|
| *A63F 9/24* | (2006.01) |
| *A63F 13/212* | (2014.01) |
| *A63F 13/65* | (2014.01) |
| *A63F 13/20* | (2014.01) |
| *A63F 13/40* | (2014.01) |
| *A63F 13/30* | (2014.01) |
| *A63F 13/235* | (2014.01) |

(52) U.S. Cl.
CPC ............ *A63F 13/212* (2014.09); *A63F 13/06* (2013.01); *A63F 13/10* (2013.01); *A63F 13/12* (2013.01); *A63F 13/65* (2014.09); *A63F 13/235* (2014.09); *A63F 2300/1012* (2013.01); *A63F 2300/1031* (2013.01); *A63F 2300/407* (2013.01); *A63F 2300/69* (2013.01)

(58) Field of Classification Search
CPC .......... A63F 13/06; A63F 13/10; A63F 13/12; A63F 13/65; A63F 13/212

USPC ................................. 463/7, 39, 43; 702/160
See application file for complete search history.

(56) References Cited

U.S. PATENT DOCUMENTS

| | | | |
|---|---|---|---|
| 6,267,677 B1 | 7/2001 | Tajiri et al. | |
| 6,482,092 B1 * | 11/2002 | Tajiri et al. | ..................... 463/43 |
| 6,582,308 B1 | 6/2003 | Yamajiri et al. | |

(Continued)

FOREIGN PATENT DOCUMENTS

| | | |
|---|---|---|
| JP | 3025213 | 3/1996 |
| JP | 08-103568 | 4/1996 |

(Continued)

OTHER PUBLICATIONS

Japanese Office Action dated Jun. 5, 2013 corresponding to Japanese Appln. No. 2008-106443.

*Primary Examiner* — Brook Kebede
(74) *Attorney, Agent, or Firm* — Nixon & Vanderhye, P.C.

(57) ABSTRACT

A game system includes a plurality of pedometers. The plurality of step count data respectively counted by the plurality of pedometers are acquired in the game apparatus. In the game apparatus, by utilizing the plurality of step count data, a predetermined arithmetic operation is executed, and the result of the arithmetic operation is reflected on the game. Alternatively, in a server, a predetermined arithmetic operation is executed by utilizing the plurality of step count data, and the result of the arithmetic operation is reflected on the game in the game apparatus. For example, game processing depending on the number of players walking in the same time slot is executed, or game processing according to the totalized value of the accumulated total step count values of the plurality of pedometers is executed.

7 Claims, 22 Drawing Sheets

(56) References Cited

U.S. PATENT DOCUMENTS

| | | | |
|---|---|---|---|
| 6,595,858 B1 | 7/2003 | Tajiri et al. | |
| 2001/0041647 A1 | 11/2001 | Itoh et al. | |
| 2008/0146890 A1* | 6/2008 | LeBoeuf et al. | 600/300 |
| 2009/0082995 A1* | 3/2009 | Fujiwara et al. | 702/160 |
| 2009/0144020 A1* | 6/2009 | Ohta et al. | 702/160 |

FOREIGN PATENT DOCUMENTS

| | | |
|---|---|---|
| JP | 08-131654 | 5/1996 |
| JP | 10-323455 A | 12/1998 |
| JP | 11-110514 | 4/1999 |
| JP | 11-318832 A | 11/1999 |
| JP | 2000-51528 A * | 2/2000 |
| JP | 2000051528 A * | 2/2000 |
| JP | 2000-271343 A | 10/2000 |
| JP | 2001-070656 A | 3/2001 |
| JP | 2001-129243 | 5/2001 |
| JP | 2001-314375 A | 11/2001 |
| JP | 2001-334069 | 12/2001 |
| JP | 2002-176426 | 6/2002 |
| JP | 2002-233663 | 8/2002 |
| JP | 2003-144759 | 5/2003 |
| JP | 2003-307431 | 10/2003 |
| JP | 2003-340149 | 12/2003 |
| JP | 2005-063288 | 3/2005 |
| JP | 2005-143657 A | 6/2005 |
| JP | 2007-190344 | 8/2007 |

* cited by examiner

FIG. 3
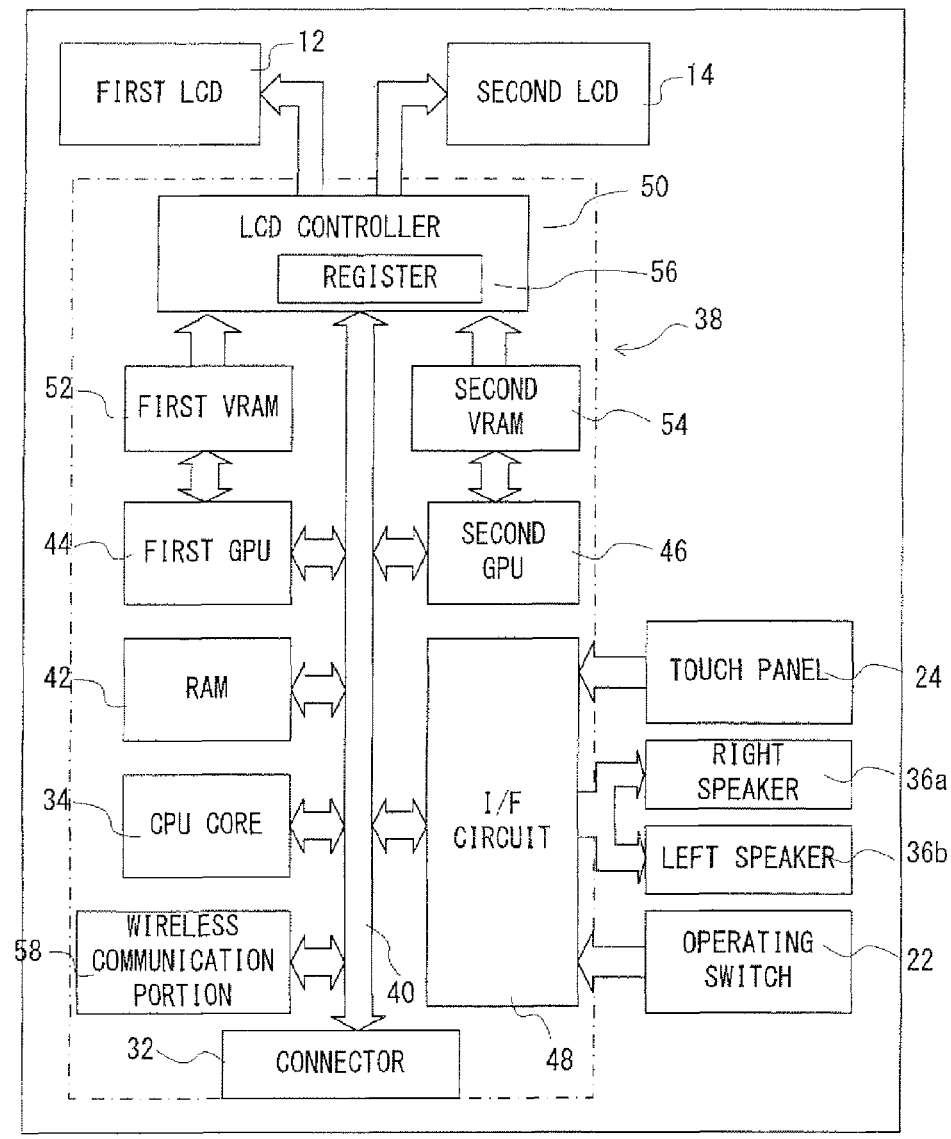
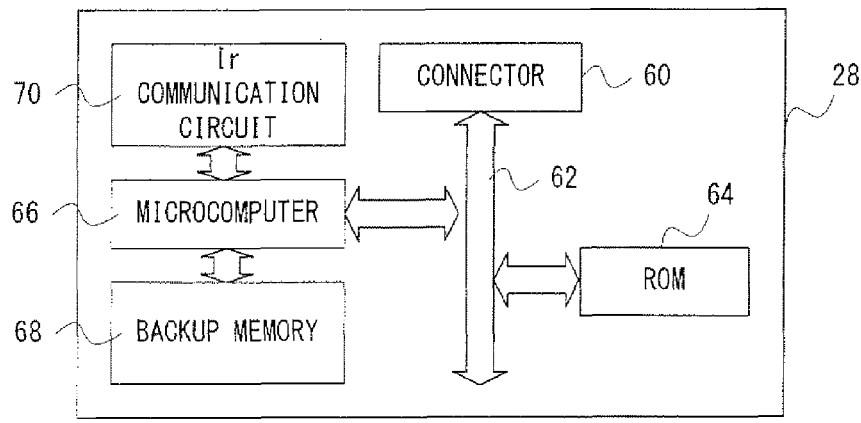

FIG. 22
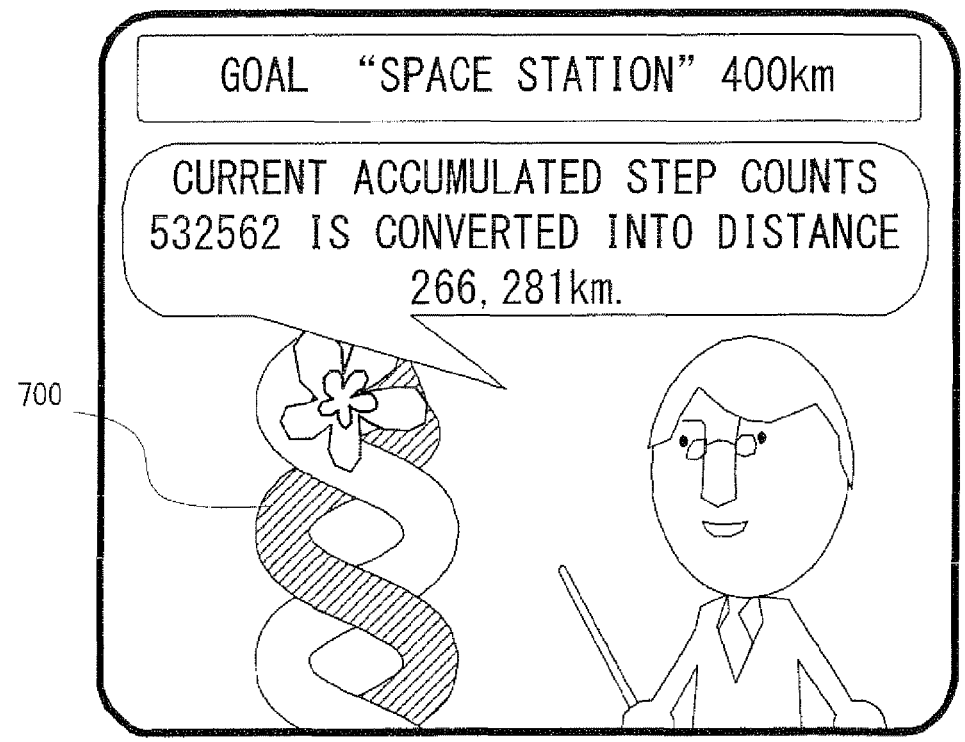
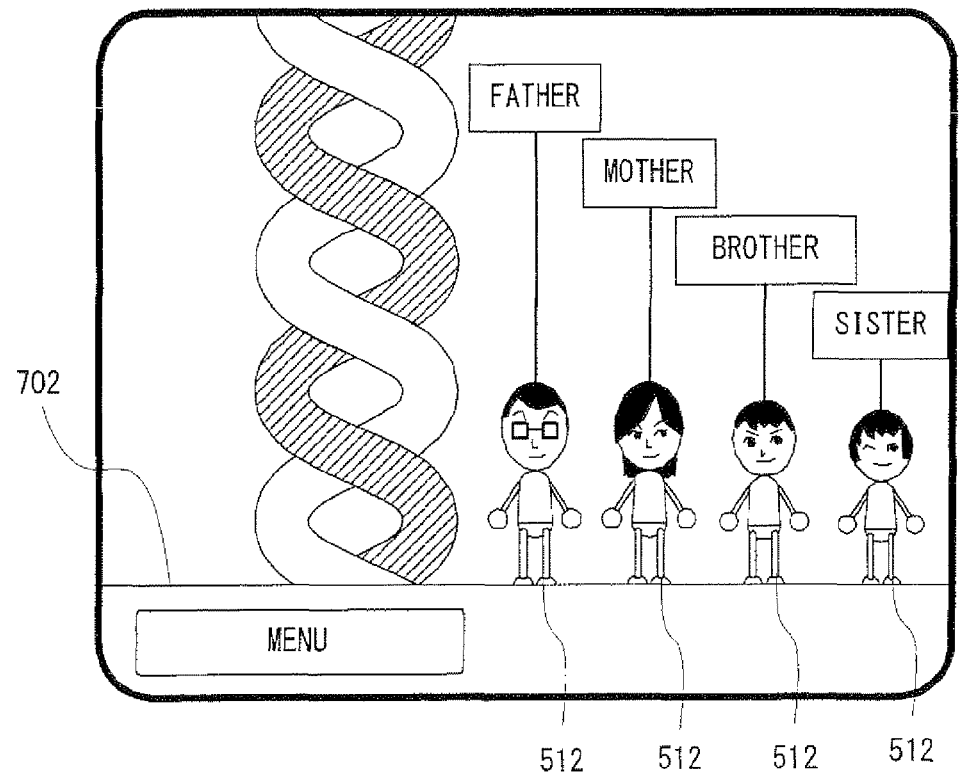

GAME SYSTEM

CROSS REFERENCE OF RELATED APPLICATION

The disclosure of Japanese Patent Application No. 2008-106443 is incorporated herein by reference,

BACKGROUND OF THE INVENTION

Field of the Invention

The invention relates to a game system. More specifically, the present invention relates to a game system for performing a game by utilizing a plurality of pedometers.

Description of the Related Art

Conventionally, in order to give willingness to exercise to a user of a pedometer, a pedometer which not only informs the step count value counted by the pedometer, but also has another function by utilizing a step count value is known.

For example, in a Patent Document 1 (Japanese Patent Laid-open No, 11-110514 [G06M 7/00, A63F 9/22, G09B 9/00]), a pedometer having a game function for changing a display state of a character on the basis of a counted value by a step number counter is disclosed. For example, in a certain time slot, the design of the character to be displayed is changed depending on whether a counted value of the step number count counter is equal to or more than a predetermined value or not.

Furthermore, in a Patent Document 2 (Japanese Patent Application Laid-Open No. 2003-307431 [G01C 22/00, A63B 69/00, G06F 17/60, G06M 7/00, G08C 19/00]), a step number management system for extracting and displaying a rank of an actual performance of the number of steps out of the plurality of persons is disclosed. This step number management system is made up of a pedometer, an external terminal, a step number management server, and a network. The pedometer detects walking, and outputs step count data to the external terminal through a communication. The external terminal outputs step the count data to the step number management server via a network, and extracts and displays a rank among a number of others registered in the server by utilizing an integrated step number management program of the step number management server.

However, the Patent Document 1 is for performing a game on the basis of the step count value by a single step counter and is not for performing a game on the basis of the step count values by a plurality of step counters. That is, this is not for calculating a plurality of step count data counted during walking by a plurality of players and to reflect the same on the game.

Furthermore, the Patent Document 2 can extract and display the rank of the step counts among the plurality of persons, but is not for calculating the number of steps of a plurality of persons to reflect the same on the game. That is, the Patent Document 2 is for merely displaying the rank, and not for performing a game on the basis of the step counts of a plurality of persons, resulting in lack of interest of the game.

SUMMARY OF THE INVENTION

Therefore, it is a primary object of the present invention to provide a novel game system.

Another object of the present invention is to provide a game system, a game apparatus, a server and a storage medium storing a game program which can perform a game by utilizing a plurality of pedometers.

A further object of the present invention is to provide a game system, a game apparatus, a server and a storage medium storing a game program which is able to improve interest of the game by utilizing step counts.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a game system including a plurality of pedometers each counting a step number and a processor. The processor comprises a step count data acquiring means for acquiring a plurality of step count data which are respectively counted by the plurality of pedometers; an arithmetic operation means for performing a predetermined arithmetic operation by utilizing the plurality of step count data; and a game processing means for reflecting the result of the arithmetic operation by the arithmetic operation means on the game.

In the first invention, a game system (200) includes a plurality of pedometers (100) and a processor (10, 202). The pedometer counts the number of steps according to the walking by a user or player. In the processor, a step count data acquiring means (34, 66, 70, S5) acquires step count data from each pedometer. By utilizing the plurality of acquired step count data, an arithmetic operation means (34, S71, S77, S137, S39, S163) performs a predetermined arithmetic operation. A game processing means (34, S73, S75, S81, S83, S87, S91, S93, S99, S111-S115, S121, S165, S167) reflects the result of the operation on the game.

According to the first invention, a plurality of step counts respectively counted by a plurality of pedometers are subjected to an arithmetic operation so as to be reflected on the game, so that it is possible to perform a game by utilizing a plurality of pedometers. Furthermore, game processing can be performed on the basis of the number of steps of the plurality of players, capable of improving interest of the game by utilizing the number of steps.

A second invention is a game system according to the first invention, and in the step count data, a step count value per unit of time is recorded, the arithmetic operation means (S71, S77) calculates a different value depending on the number of step count data each recording one or more step count values in the same time slot, and the game processing means (S73, S75, S81, S83, S87, S91, S93, S99) executes game processing on the basis of the calculated value.

According to the second invention, game processing on which a value calculated depending on the number of players walking in the same time slot is reflected is executed, and therefore, the game content is changed depending on the number of players simultaneously walking. Accordingly, it is possible to provide enjoyment of walking with a plurality of players in cooperation with one another, such as walking together with all the persons, walking in the same time slot, etc.

A third invention is a game system according to the first invention, and the arithmetic operation means (S137, S163) totalizes accumulated step count values of the plurality of pedometers, and the game processing means (S111-S115, S165, S167) executes game processing on the basis of the totalized value.

According to the third invention, game processing on which a total amount of the number of steps counted by the plurality of pedometers is reflected is performed, and therefore, the content of the game is changed depending on how far the plurality of players walk as a whole. Accordingly, for example, it is possible to provide a way of enjoyment of walking a plurality of players together in cooperation with one another, such as making all the persons walk a lot.

A fourth invention is a game system according to the first to third inventions, and the processor includes a plurality of game apparatuses (10) and a server (202), the arithmetic operation means (S137, S139) is provided in the server, and the game apparatus includes a first transmitting means (34, 58, S107) for transmitting the step count data acquired from at least one pedometer to the server and a first receiving means (34, 58, S109, S117) for receiving the result of the arithmetic operation from the server, and the server includes a second receiving means (S131) for receiving the step count data from each of the game apparatuses and a second transmitting means (S147, S153, S155) for transmitting the result of the arithmetic operation by the arithmetic operation means to each of the game apparatuses.

According to the fourth invention, a predetermined arithmetic operation utilizing a plurality of step count data is executed in the server, and therefore, each game apparatus can execute game processing by utilizing the result of the arithmetic operation from the server. Accordingly, it is possible to reduce a processing load of the game apparatus. Furthermore, in the server, an arithmetic operation can be performed by utilizing step count data of a number of players, such as an unknown person who lives far away, and therefore, it is possible to provide a way of enjoyment of walking in cooperation with an unknown player who lives far away.

A fifth invention is a game system according to the first to fourth inventions, and the game processing means changes a parameter of an object (512, 516, 610, 700) depending on the result of the arithmetic operation by the arithmetic operation means.

According to the fifth invention, it is possible to change various parameters, such as a movement, brightness, a position, a height of an object on the basis of the plurality of step count data. Since the object can be controlled by the plurality of step count data, it is possible to provide a way of enjoyment of walking a plurality of players together in cooperation with one another.

A sixth invention is a storage medium storing a game program to be executed in a computer of a game apparatus utilized in a game system including a plurality of pedometers each counting a step number. The game program causes the computer to execute a step count data acquiring step for acquiring a plurality of step count data respectively counted by the plurality of pedometers, an arithmetic operation step for performing a predetermined arithmetic operation by utilizing the plurality of step count data, and a game processing step for reflecting the result of the arithmetic operation by the arithmetic operation step on the game.

In the sixth invention, it is possible to provide the storage medium storing a game program which can be utilized in the above-described first invention, and an advantage similar to the first invention is obtained.

A seventh invention is a game apparatus to be utilized in a game system including a plurality of pedometers each counting a step number. The game apparatus comprises a step count data acquiring means for acquiring a plurality of step count data respectively counted by the plurality of pedometers; an arithmetic operation means for performing a predetermined arithmetic operation by utilizing the plurality of step count data; and a game processing means for reflecting the result of the arithmetic operation by the arithmetic operation means on the game.

In the seventh invention, it is possible to provide a game apparatus which can be used in the above-described first invention, and an advantage similar to the first invention is obtained.

An eighth invention is a storage medium storing a game program to be executed in a computer of a game apparatus utilized in a game system including a plurality of pedometers each counting a step number and a server performing a predetermined arithmetic operation by utilizing a plurality of step count data. The game program causes the computer to execute a step count data acquiring step for acquiring step count data counted by at least one pedometer, a first transmitting step for transmitting the step count data to the server, a first receiving step for receiving from the server the result of the predetermined arithmetic operation by utilizing the plurality of step count data, and a game processing step for reflecting the result of the operation on the game.

In the eighth invention, it is possible to provide the storage medium storing a game program of the game apparatus which can be utilized in the above-described fourth invention, and an advantage similar to the fourth invention is obtained.

A ninth invention is a game apparatus to be utilized in a game system including a plurality of pedometers each counting a step number and a server for performing a predetermined arithmetic operation by utilizing a plurality of step count data. The game apparatus comprises a step count data acquiring means for acquiring step count data counted by at least one pedometer; a first transmitting means for transmitting the step count data to the server; a first receiving means for receiving from the server the result of the predetermined arithmetic operation by utilizing the plurality of step count data; and a game processing means for reflecting the result of the operation on the game.

In the ninth invention, it is possible to provide the game apparatus utilized in the above-described fourth invention, and an advantage similar to the fourth invention is obtained.

A tenth invention is a storage medium for storing a game program to be executed in a computer of a server to be utilized in a game system including a plurality of pedometers each counting a step number and a plurality of game apparatuses. The game program causes the computer to execute a second receiving step for receiving the step count data acquired from at least one pedometer; an arithmetic operation step for performing a predetermined arithmetic operation by utilizing a plurality of step count data; and a second transmitting step for transmitting the result of the arithmetic operation by the arithmetic operation step to each of the game apparatuses.

In the tenth invention, it is possible to provide a storage medium storing a game program of the server to be utilized in the above-described fourth invention, and an advantage similar to the fourth invention is obtained.

An eleventh invention is a server to be utilized in a game system including a plurality of pedometers each counting a step number and a plurality of game apparatuses. The server comprises a second receiving means for receiving the step count data acquired by each game apparatus from at least one pedometer, an arithmetic operation means for performing a predetermined arithmetic operation by utilizing a plurality of step count data, and a second transmitting means for transmitting the result of the arithmetic operation by the arithmetic operation means to each of the game apparatuses.

In the eleventh invention, it is possible to provide a server to be utilized in the above-described fourth invention, and an advantage similar to the fourth invention is obtained.

According to the present invention, it is possible to provide a game utilizing a plurality of pedometers, and also possible to improve interest of the game utilizing the number of steps.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing one example of an electric configuration of the game apparatus;

FIG. 22 is an illustrative view showing one example of a screen of a raising game.

DETAILED DESCRIPTION OF THE PREFERRED EMBODIMENTS

Figure 1:
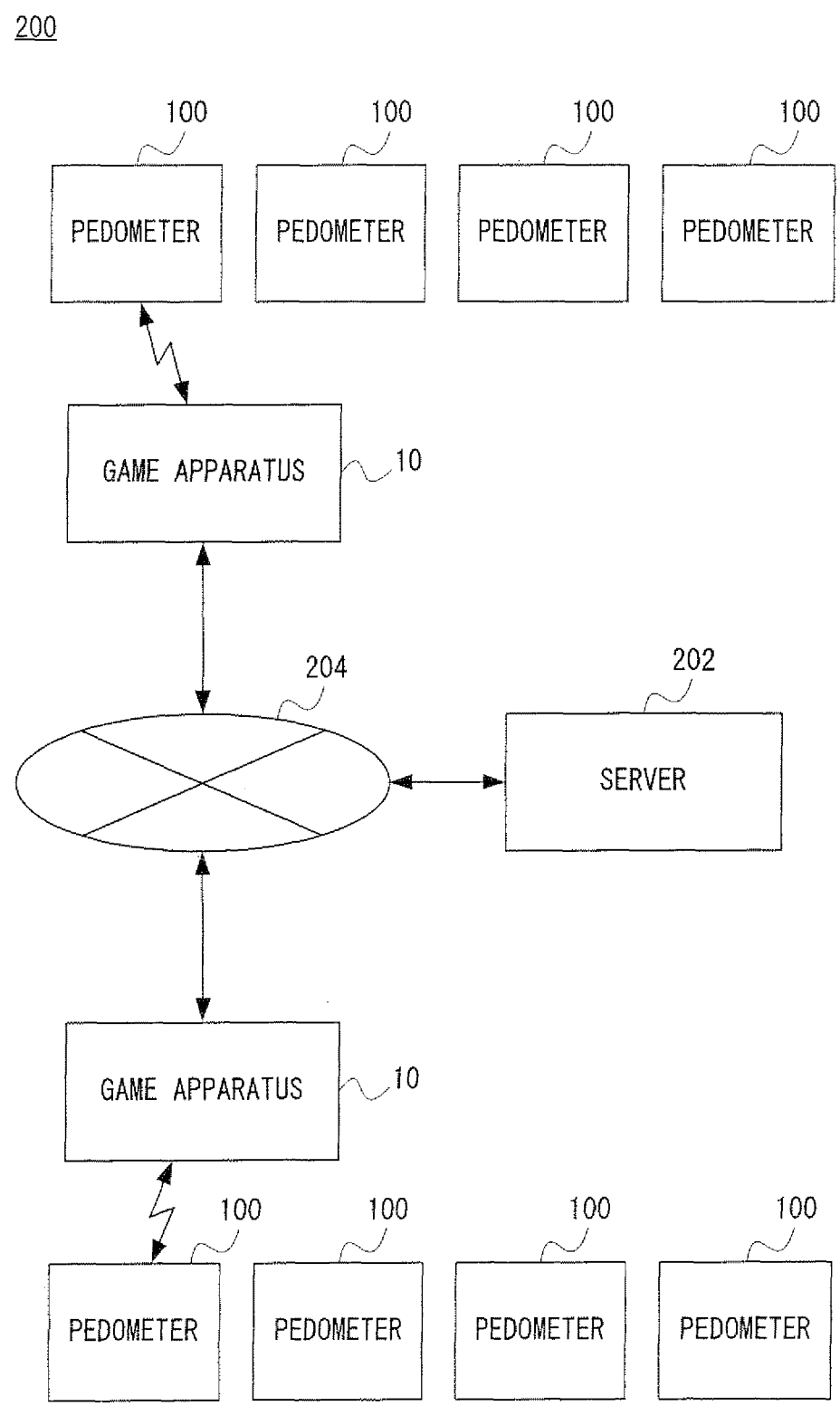
FIG. 1 is an illustrative view showing one embodiment of a game system of this invention.

Referring to FIG. 1, a game system 200 of this embodiment of the present invention includes a plurality of pedometers 100 and a game apparatus 10. The pedometer 100 is for counting a step number, i.e., the number of steps according to walking by the user. The game apparatus 10 is a processor for performing predetermined processing by utilizing a plurality of step count data respectively counted by the plurality of pedometers 100. The game apparatus 10 and the respective pedometers 100 transmit and receive data by a short distance wireless communication, such as Bluetooth, IrDA, etc.

Additionally, in this embodiment, the game apparatus 10 is configured so as to be able to fetch or acquire step count data from the registered four pedometers 100 at the maximum, and therefore, four pedometers 100 are represented with respect to one game apparatus 10 in FIG. 1. Here, the number of registered pedometers 100 with respect to the game apparatus 10 can be changed as necessary.

In addition, the game system 200 of this embodiment includes a server 202. The server 202 is a computer, and includes a CPU, a RAM, an HDD, etc. The server 202 is connected so as to be communicated with a plurality of game apparatuses 10 over a network 204, such as a wireless LAN, the Internet, etc. Therefore, in FIG. 1, two game apparatuses 10 are shown for the sake of convenience. The server 202 acquires step count data counted by at least one pedometer 100 from the respective game apparatuses 10. The server 202 functions as a processor for performing predetermined processing by utilizing a plurality of step count data together with the game apparatuses 10.

Figure 2:
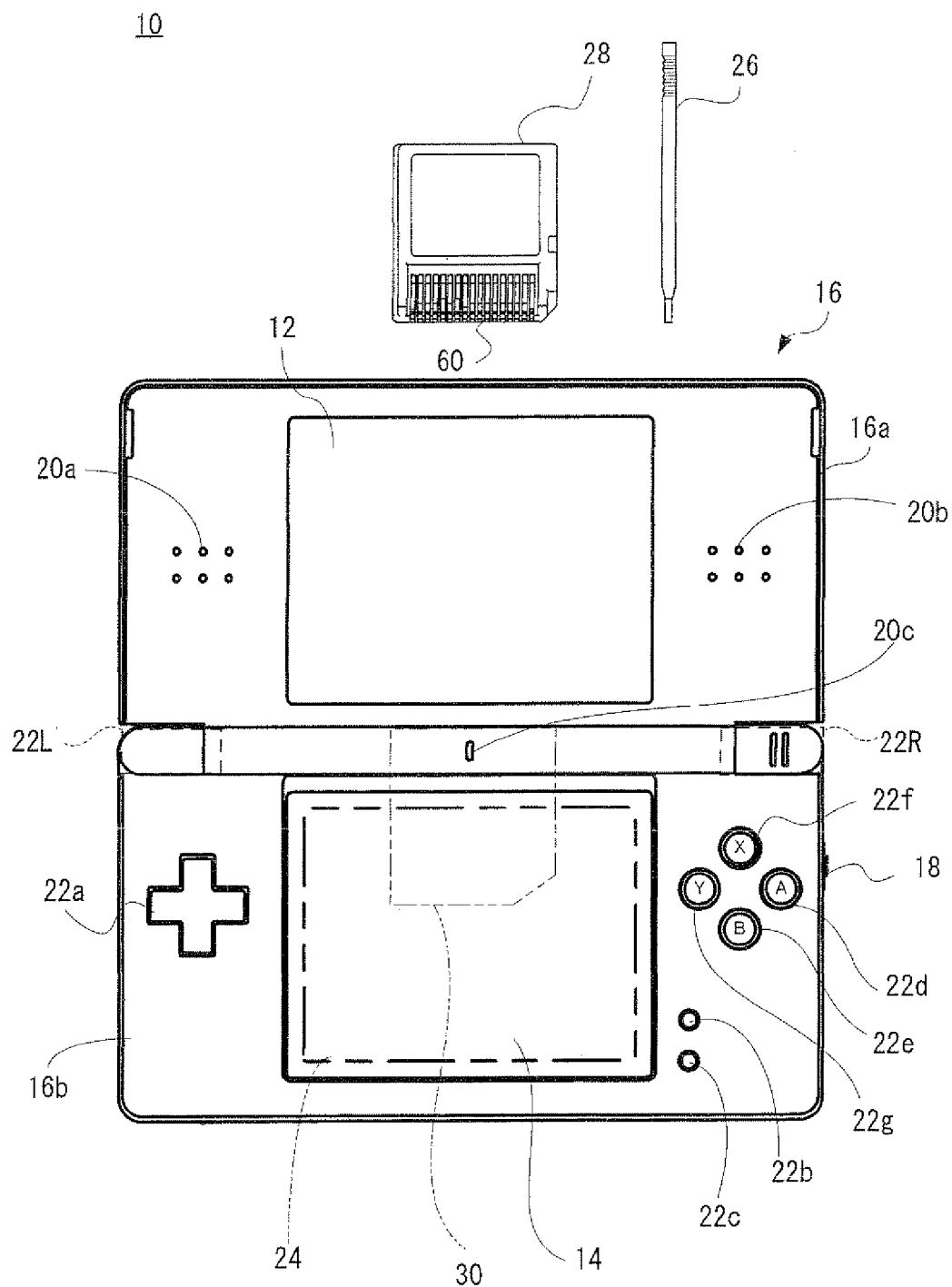
FIG. 2 is an illustrative view showing one example of an external view of the game apparatus.

Referring to FIG. 2, the game apparatus 10 is implemented in the form of the hand-held typed game apparatus as one example. However, the form of the game apparatus 10 is arbitrary, and may be a console typed game apparatus, a personal computer, a mobile information terminal, a cellular phone, for example.

The game apparatus 10 includes a first liquid crystal display (LCD) 12 and a second LCD 14. The LCD 12 and the LCD 14 are set on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 2, the upper housing 16a has a plane shape little larger than a plane shape of the LCD 12, and has an opening formed so as to expose a display surface of the LCD 12 from one main surface thereof. On the other hand, the lower housing 16b has a plane shape and a size approximately the same as those of the upper housing 16a, and has an opening formed so as to expose a display surface of the LCD 14 at an approximately center of the horizontal direction. Also, a power switch 18 is provided at the right side surface of the lower housing 16b.

Furthermore, the upper housing 16a is provided with sound release holes 20a and 20b for speakers 36a and 36b (see FIG. 3) on both sides of the LCD 12.

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone (not illustrated) is formed at the center of the connected portion between the upper housing 16a and the lower housing 16b. This makes it possible to perform game processing on the basis of a sound signal by a sound, a voice or a breath taken from the microphone.

Furthermore, the lower housing 16b is provided with an operating switch 22 (22a, 22b, 22c, 22d, 22e, 22f, 22g, 22L and 22R).

The operating switch 22 includes a direction instructing switch (cross switch) 22a, a start switch 22b, a select switch 22c, an action switch (A button) 22d, an action switch (B button) 22e, an action switch (X button) 22f an action switch (Y button) 22g, an action switch (L button) 22L, and an action switch (R button) 22R. The switch 22a is arranged at the left of the LCD 14 on one surface of the lower housing 16b. The other switches 22b-22g are arranged at the right of the LCD 14 on the one surface of the lower housing 16b. In addition, the operating switches 22L and 22R are arranged at the right and left corners on the upper side surface of the lower housing 16b. It should be noted that action switches 22L and 22R are provided on a back surface of the lower housing 16b, and shown by dotted line because they are hidden under the connected portion in a front view as shown in FIG. 2.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operations to the A button 22d and B button 22e. Of course, the X button 22f and the Y button 22g are not necessarily utilized in the game play.

The action switch (left depression button) 22L and the action switch (right depression button) 22R are formed by the push buttons, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. The touch panel 24 is a pointing device for designating an arbitrary position (coordinates) within the screen of the LCD 14 by the user. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position by the stick 26, etc. to output coordinates data corresponding to the detected coordinates.

It should be noted that in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player object, etc. are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Furthermore, by utilizing the two LCD 12 and LCD 14 as one screen, it is possible to display a large monster (enemy object) to be defeated by the player object.

Accordingly, the player is able to point (operate) an image such as a player object, an enemy object, an item object, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the virtual game space (three-dimensional game space), and instruct a scrolling (gradual moving display) direction of the game screen (map).

Additionally, depending on the kind of the game, other input instructions can be made with the use of the touch panel 24. For example, it is possible to input by hand texts, numbers, symbols, etc. on the LCD 14 of the touch panel 24.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

Although the first LCD 12 and the second LCD 14 are vertically arranged, the arrangement of the two LCDs may be changed as necessary. In another embodiment, the first LCD 12 and the second LCD 14 may horizontally be arranged.

Furthermore, in this embodiment, two LCDs are provided, but the number of LCDs as a display means can be changed as necessary. In another embodiment, a vertically-long LCD is provided, and by vertically dividing the display areas into two, two game screens may be displayed on the respective display areas, or a horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 2) provided on an upper edge surface of the lower housing 16b. Although omitted in FIG. 2, a connector 32 (see FIG. 3) is provided at a depth portion of the loading slot 30 for connecting a connector 60 provided at an end portion of the memory card 28 in the loading direction, and when the memory card 28 is loaded into the loading slot 30, the connectors are connected with each other, and therefore, the memory card 28 is accessible by a CPU core 34 (see FIG. 3) of the game apparatus 10.

Furthermore although omitted in FIG. 2, a battery accommodating box is provided on a rear surface of the lower housing 16b, a volume switch, an earphone jack, etc. are provided on the lower edge surface (bottom surface) of the lower housing 16b, and an external expansion connector is provided on the upper edge surface (top surface), for example.

FIG. 3 is a block diagram showing an electrical configuration of the game apparatus 10. Referring to FIG. 3, the game apparatus 10 includes an electronic circuit board 38, and on the electronic circuit board 38, circuit components, such as a CPU core 34, etc. are mounted. The CPU core 34 is connected to the above-described connector 32 via a bus 40, and is connected with a RAM 42, a first graphics processing unit (GPU) 44, a second CPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a connector 60 to be connected to the connector 32, and the connector 60 is connected with a ROM 64 and a microcomputer 66 via a bus 62. The microcomputer 66 is connected with a backup memory 68 and an Ir communication circuit 70.

The microcomputer 66 controls writing and reading the backup memory 68 under the control of the CPU core 34, and controls an infrared rays communication (Ir communication) by utilizing the Ir communication circuit 70. That is, the CPU core 34 writes and reads data to and from the backup memory 68 via the microcomputer 66. Furthermore, the CPU core 34 transmits and receives data with a pedometer 100 via the microcomputer 66 and the Ir communication circuit 70. Here, although not seen in FIG. 2, a communication port of the Ir communication circuit 70 is provided at a position (on the top surface, for example) exposed when the memory card 28 is loaded into the loading slot 30.

The ROM 64 stores in advance a game program for a game to be executed by the game apparatus 10, image data (text and object image, background image, item image, icon (button) image, message image, etc.), data of the sound (music) necessary for the game (sound data), etc. The backup memory 68 stores (saves) proceeding data of the game, result data of the game, etc. As a backup memory 68, a nonvolatile memory, such as a flash memory, an SRAM to which power is supplied from a battery, etc. can be used.

The RAM 42 is utilized as a buffer memory or a working memory. That is, the CPU core 34 loads the game program, the image data, the sound data, etc. stored in the ROM 64 of the memory card 28 into the RAM 42, and executes processing according to the loaded game program. Furthermore, the CPU core 34 executes a game process while storing data (game data, flag data, etc.) temporarily generated or obtained in correspondence with a progress of the game in the RAM 42.

Each of the GPU 44 and the CPU 46 forms a part of a rendering means, is constructed by, for example, a single chip ASIC, and receives a graphics command (drawing instruction) from the CPU core 34 to generate image data according to the graphics command. It should be noted that the CPU core 34 applies an image generation program (included in the game program) required to generate the image data to both of the GPU 44 and GPU 46 in addition to the graphics command.

Furthermore, the CPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: polygon data, texture data, etc.) to execute a graphics command.

In addition, the CPU core 34 writes image data necessary for drawing to the first VRAM 52 and the second VRAM 54 via the CPU 44 and the GPU 46. The GPU 44 accesses the VRAM 52 to produce image data necessary for drawing and stores the same in a rendering buffer of the VRAM 52. The GPU 46 accesses the VRAM 54 to produce image data for drawing and stores the same in the rendering buffer of the VRAM 54. As a rendering buffer, a frame buffer, a line buffer, etc. may be adopted.

The VRAM 52 and the VRAM 54 are connected to the LCD controller 50 The LCD controller 50 includes a register 56, and the register 56 consists of for example, one bit, and stores a value of "0" or "1" (data value) according to an instruction of the CPU core 34. The LCD controller 50 outputs the image data produced by the CPU 44 to the LCD 12, and outputs the image data produced by the GPU 46 to the LCD 14 in a case that the data value of the register 56 is "0". Additionally, the LCD controller 50 outputs the image data produced by the GPU 44 to the LCD 14, and outputs the image data produced by the GPU 46 to the LCD 12 in a case that the data value of the register 56 is "1".

Furthermore, the LCD controller 50 can directly read the image data from the VRAM 52 and the VRAM 54, or read the image data from the VRAM 52 and the VRAM 54 via the CPU 44 and the GPU 46.

In addition, the VRAM 52 and the VRAM 54 may be provided in the RAM 42, or a rendering buffer and a Z buffer therefor may be provided in the RAM 42.

The I/F circuit 48 is connected with the operating switch 22, the touch panel 24 and the speakers 36a, 36b. Here, the operating switch 22 is the above-described switches 22a, 22b, 22c, 22d, 22e, 22f, 22g, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

The wireless communication portion 58 is a communication means for transmitting and receiving data with another game apparatus 10 or communication equipment by radio waves. Here, the weak radio wave transmitted and received by the game apparatus 10 is set in intensity to such a degree as not to be restricted by the Radio Law. When the CPU core 34 applies data such as game data, a command, etc. to the wireless communication portion 58, the wireless communication portion 58 modulates communication data to be transmitted to the opponent into a wireless signal and transmits it from an antenna. Furthermore, the wireless communication portion 58 receives a wireless signal from the opponent by the antenna to demodulate it to data, and applies the data to the CPU core 34. Via the wireless communication portion 58, the game apparatus 10 can receive and transmit data with other game apparatuses 10 to thereby execute a communication game. The game apparatus 10 can connect to a network 204 via the wireless communication portion 58, and thus can download a program and data from a server 202 on the network 204, upload data to the server 202, communicate with another game apparatus 10 via the network 204.

Figure 4:
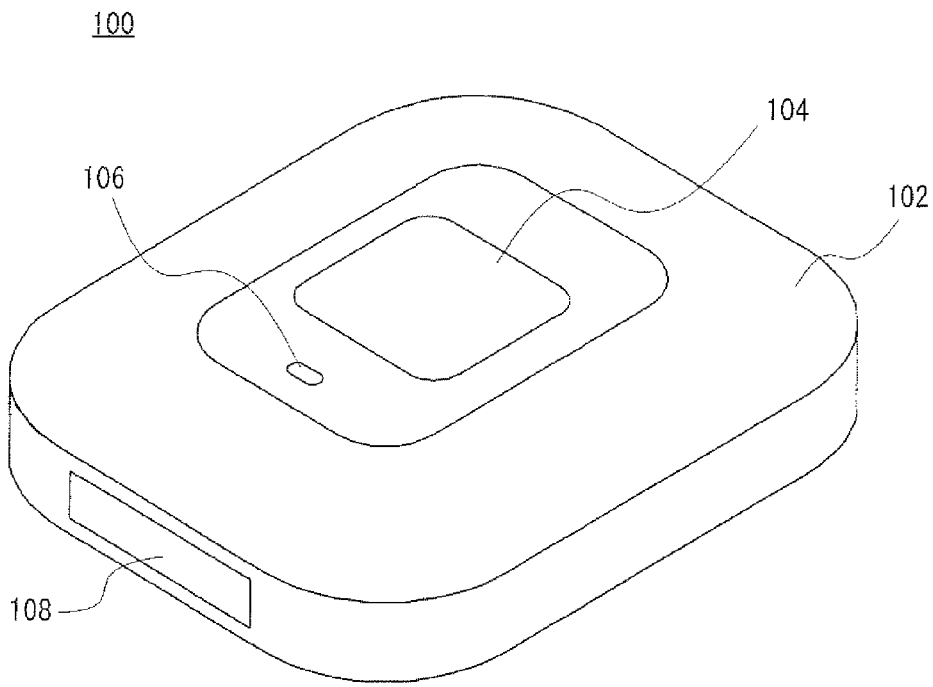
FIG. 4 is a perspective view showing one example of an external view of a pedometer.

FIG. 4 shows a perspective view showing one example of the pedometer 100. The pedometer 100 has a housing 102 in a roughly rectangular parallelepiped shape, and the housing 102 is made small enough to be put in a pocket, etc. of the user, and has lengths longitudinally and transversely in the order of 3 to 4 cm, and a thickness of the order of 1 cm as one example. The housing 102 is provided with a push button 104 on one main surface (top surface). In a case that the Ir communication circuit 70 of the memory card 28 is in a communication standby state, when the push button 104 is pushed by the user, the pedometer 100 starts to communicate with the memory card 28, that is, the game apparatus 10. Furthermore, at the end of the push button 104, an LED 106 is provided. The LED 106 is two-color LED, for example, and represents an operating condition of the pedometer 100 by a color, a flashing pattern. Furthermore, on the side surface (tip-end surface) of the housing 102, an infrared communication port 108 is provided. Additionally, as an operating power source of the pedometer 100, a coin shaped lithium cell (CR2032) is used, for example, and on the other main surface (bottom surface) of the housing 102, a battery cover is detachably provided.

Figure 5:
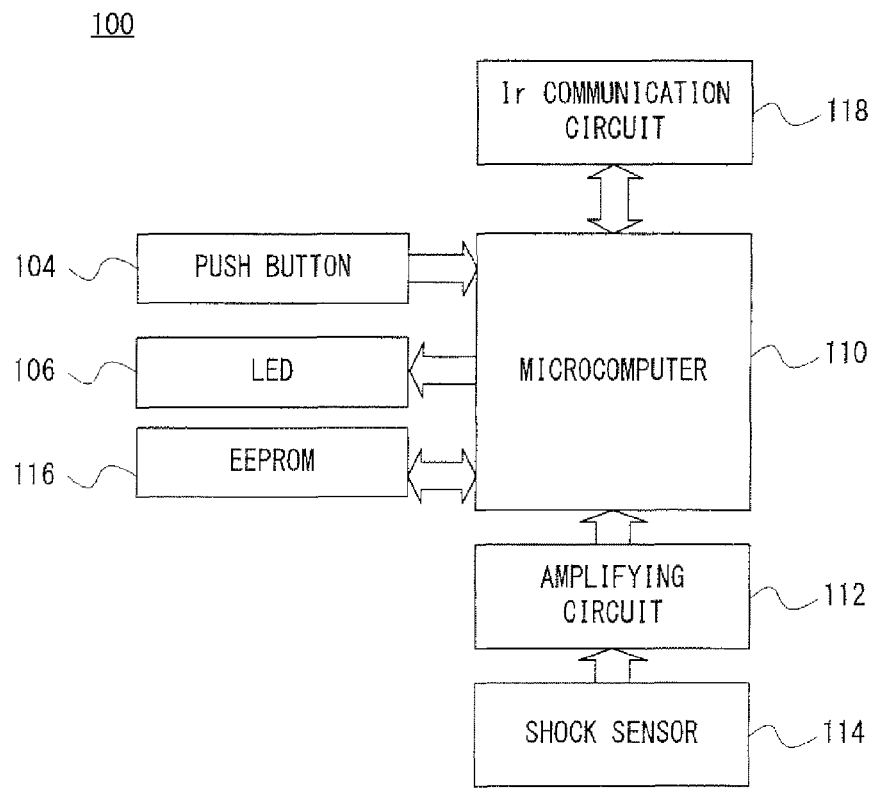
FIG. 5 is a block diagram showing one example of an electric configuration of the pedometer.

FIG. 5 is a block diagram showing one example of an electric configuration of the pedometer 100. The pedometer 100 includes a microcomputer 110, and the microcomputer 110 is connected with a shock sensor 114 via an amplifying circuit 112. Furthermore, the microcomputer 110 is connected with the push button 104, the LED 106, an EEPROM 116 and an Ir communication circuit 118.

The microcomputer 110 is a low power consumption microcomputer integrated with a step counter algorithm, and controls an entire operation of the pedometer 100, such as detection of output data from the shock sensor 114, writing to and reading data from the EEPROM 116, flashing of the LED 106, and an infrared rays communication by utilizing the Ir communication circuit 118, etc.

The shock sensor 114 is a sensor for detecting a motion according to walking by the user, and is applied with a shock sensor (acceleration sensor) used for an impact detection of an HDD. The shock sensor 114 is arranged in two-axis directions in this embodiment, and this makes it possible for the user to count or detect a step count (the number of steps) with the pedometer 100 in the pocket, the bag, etc. The output from the shock sensor 114 is amplified in the amplifying circuit 112 and then input to the microcomputer 110. Since the microcomputer 110 contains an AD converter, the microcomputer 110 performs a sampling on the output from the shock sensor 114 to acquire output data (acceleration data). The microcomputer 110 counts the step count on the basis of the output data and the step counter algorithm, and sequentially stores an accumulated value (the number of counts) of the step count per unit of time in the EEPROM 116. That is, the EEPROM 116 stores a historical record of step count values per unit of time as step count data.

Here, there is a limit to the storage area for the step count data in the EEPROM 116. For example, in a case that a step count value is stored every minute, the EEPROM 116 can store about seven day's historical records of the step counts. In a case that the storage area becomes full, the oldest-stored step count value is overwritten. Furthermore, in this embodiment, the unit of time for recording the step count value is set to one minute, but this may be changed to one hour, one day, etc., for example, as necessary.

The microcomputer 110 controls the color and the flashing pattern of the LED 106 depending on the operating condition or state. For example, in a case that the number of steps on that day is above the step count set in advance, the color of the LED 106 is changed from red to yellow green. Furthermore, when the push button 104 is pushed, the microcomputer 110 starts a communication with the game apparatus 10 (memory card 28) by utilizing the Ir communication circuit 118, and blinks the LED 106 for confirming the start of the communication and checking the operation.

When the push button 104 is pushed to start a communication, the microcomputer 110 reads an ID (identification information) of the pedometer 100 from an internal ROM or the EEPROM 116, and transmits the data including the ID to the game apparatus 10 through the Ir communication circuit 118. Then, when receiving a request of step count data from the game apparatus 10, the microcomputer 110 reads necessary step count data from the EEPROM 116 and transmits the same to the game apparatus 10. Here, the game apparatus 10 stores the date and time information when the step count data is previously received from the pedometer 100, and requests the step count value for a necessary time or the necessary number of count values, so that the microcomputer 110 can read the step count value for a necessary time or the necessary number of count values as far back as the past from the current step count value, and transmit the same to the game apparatus 10.

In the game system 200, a predetermined arithmetic operation is executed by utilizing a plurality of step counts respectively counted by a plurality of pedometers 100, and the result of the arithmetic operation is reflected on the game. In this embodiment, a case that the invention is applied to an electric power generation game and a space travel game, as one example is explained.

In the electric power generation game, an arithmetic operation from which a different value is calculated depending on the number of step count data detected with one or more step count value is executed, and the game processing is executed on the basis of the value of the result of the arithmetic operation. Thus, the content of the game is changed depending on the number of players walking at the same time or hour. Accordingly, it is possible to implement a game played in accordance with all the players walking together therewith or at the same time or hour, for example, which can provide way of enjoyment in which a plurality of players walk in cooperation with one another.

Furthermore, in the space travel game, the accumulated values of the step counts counted by the respective pedometers 100 are totalized, and the game processing is executed on the basis of the totalized value. Thus, by the totalized value of the accumulated step count values of the plurality of players, the content of the game is changed. Accordingly, it is possible to implement a game played in accordance with all the players walking a lot, for example, which can provide way of enjoyment in which a plurality of players walks in cooperation with one another.

Figure 6:
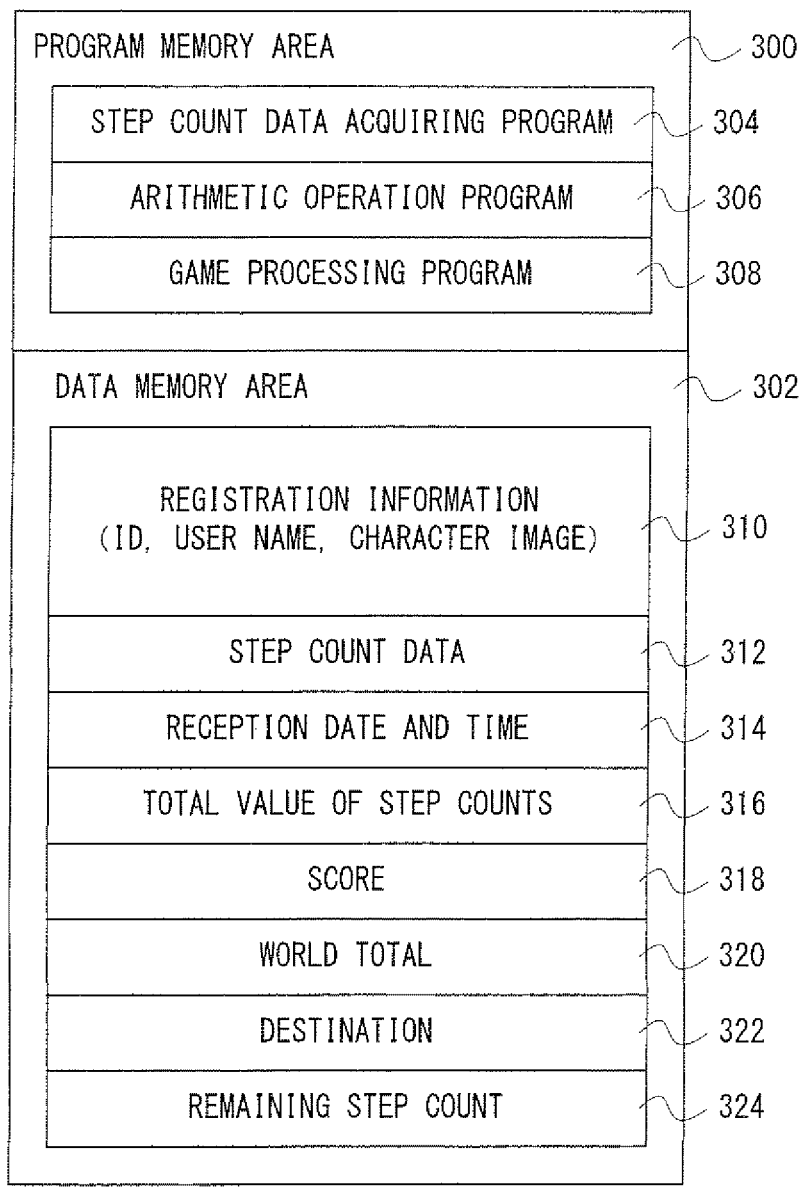
FIG. 6 is an illustrative view showing one example of a memory map of the game apparatus.

FIG. 6 shows one example of a memory map of the game apparatus 10. The memory map includes a program memory area 300 and a data memory area 302. FIG. 6 shows a part of the memory map, and the program memory area 300 and the data memory area 302 stores other programs and data necessary for processing, such as an image generating and displaying program, an operation data acquiring program and image data, etc.

A memory area 304 of the program memory area 300 stores step count data acquiring program. This step count data acquiring program is for acquiring step count data from each of the plurality of pedometers 100. A memory area 306 stores an arithmetic operation program. The arithmetic operation program is a program for executing a predetermined arithmetic operation by utilizing a plurality of step count data. A memory area 308 stores a game processing program. This game processing program is a program for reflecting the result of the arithmetic operation on the game.

The data memory area 302 stores data read from the ROM 64 or the backup memory 68, and data generated or acquired by the processing.

A memory area 310 stores registration information of the pedometer 100. More specifically, a user name and a character image (image data of the character used by the user in the game) are stored by brought them into correspondence to the ID of the pedometer 100. Here, the ID of the pedometer 100 is acquired from the pedometer 100 by first execution of registration processing of the pedometer 100. As described above, in this embodiment, one game apparatus 10 can register four pedometers 100 at a maximum. Furthermore, a user name and a character image can be input or designated by the user at the initial setting. The registration information is stored in the backup memory 68, and read into the RAM 42 from the backup memory 68 as required.

A memory area 312 stores step count data respectively received from the plurality of pedometers 100 by bringing them into correspondence to the IDs. The received step count data is stored in the backup memory 68 as required.

A memory area 314 stores the reception date and time when step count data acquiring processing from the pedometer 100 is last executed by bringing them into correspondence to the ID. These reception date and time are stored in the backup memory 68. When the step count data acquiring processing from the pedometer 100 is performed, the reception date and time are read from the backup memory 68. Accordingly, it is possible to acquire from the pedometer 100 the step count data from the current date and time acquired from an internal time piece circuit to the reception date and time. When the step count data is acquired, the reception date and time is updated to the current date and time, and also stored in the backup memory 68.

A memory area 316 stores a total value of the step count values recorded in the step count data received from the pedometer 100 by bringing it into correspondence to the ID. In the space travel game, each game apparatus 10 transmits the step count data acquired from at least one pedometer 100 to the server 202, and the server 202 performs a predetermined arithmetic operation by utilizing the plurality of step count data. The total value of the step counts is calculated as step count data to be transmitted to the server 202 in the space travel game.

A memory area 318 stores a score of the electric power generation game. The score is calculated on the basis of the received step count data. In the electric power generation game, by regarding the users of a plurality of pedometers 100 registered in the game apparatus 10 as a family, the score of the family is calculated. The more the number of members of the family walking in the same time slot is, the higher the score is. On the basis of this score, the parameter of the object is controlled, cheerfulness of the family is evaluated, and so forth. The score is stored in the backup memory 68, and read when the electric power generation game is executed.

In the memory area 320, a world total calculated in the space travel game is stored. The world total is the total of the step counts of all the users after the space travel game is started. This world total is calculated by the server 202 by totalizing the accumulated step count values of the plurality of pedometers 100 transmitted from the plurality of game apparatuses 10. The calculated world total is transmitted to the respective game apparatuses 10 from the server 202. The world total is stored in the backup memory 68, and read when the space travel game is executed.

The memory area 322 stores destinations set in the space travel game. In the space travel game, destinations to be reached by the world total are set. The destinations are stored in the backup memory 68, and read when the space travel game is executed. A necessary step count value is set for each destination in advance as a step count condition, and when the world total satisfies the step count condition of the current destination, the destination is updated to a next destination set in advance.

A memory area 324 stores a remaining step count to the destination in the space travel game. The remaining step count is a difference between the step count condition of the destination and the world total.

Figure 7:
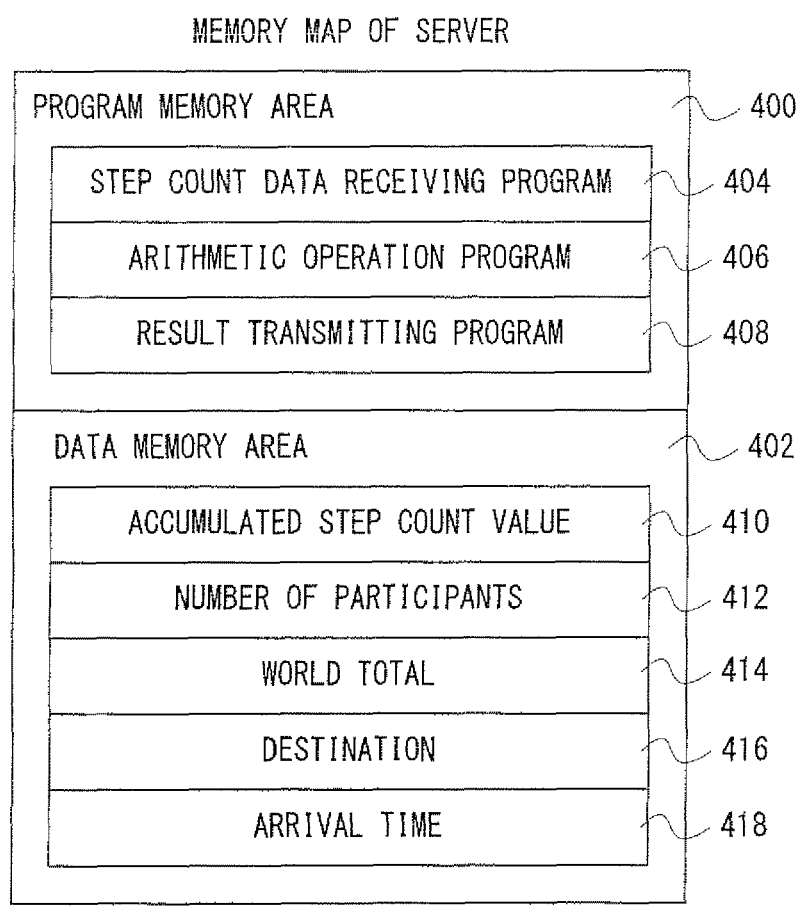
FIG. 7 is an illustrative view showing one example of a memory map of a server.

FIG. 7 shows one example of a memory map of the server 202. The memory map includes a program memory area 400 and a data memory area 402. Here, FIG. 7 shows a part of the memory map, and the program memory area 400 and data memory area 402 store other programs and data required for executing the processing.

A memory area 404 stores a step count data receiving program. This program is for receiving step count data from the respective game apparatuses 10. A memory area 406 stores an arithmetic operation program. This program is for executing a predetermined arithmetic operation by utilizing a plurality of step count data. A memory area 408 stores a result transmitting program. This program is for transmitting the result of the arithmetic operation to the respective game apparatuses 10.

A memory area 410 of the data memory area 402 stores an accumulated step count value. The accumulated step count value is an accumulative value of the step count values counted by each pedometer 100, and stored by bringing it into correspondence to each ID. Since the step count data received from each of the game apparatuses 10 includes the ID of the pedometer 100, an accumulated step count value for each ID is calculated and stored.

A memory area 412 stores the number of participants in the space travel game. For example, by counting the number of IDs corresponding to the received step count data, the number of participants can be calculated.

A memory area 414 stores a world total. The world total is the total of the step counts of all the players participating in the space travel game, and calculated by totalizing the accumulated step count values of the respective pedometers 100 stored in the memory area 410.

A memory area 416 stores destinations. In the space travel game, destinations to be reached by the world total are set. When the world total satisfies the step count condition of the current destination, the destination is updated from the route set in advance to a next destination.

A memory area 418 stores an arrival time. The arrival time is the number of dates taken from the time when the space travel game is started to the time when the world total satisfies the step count condition of the current destination.

Figure 8:
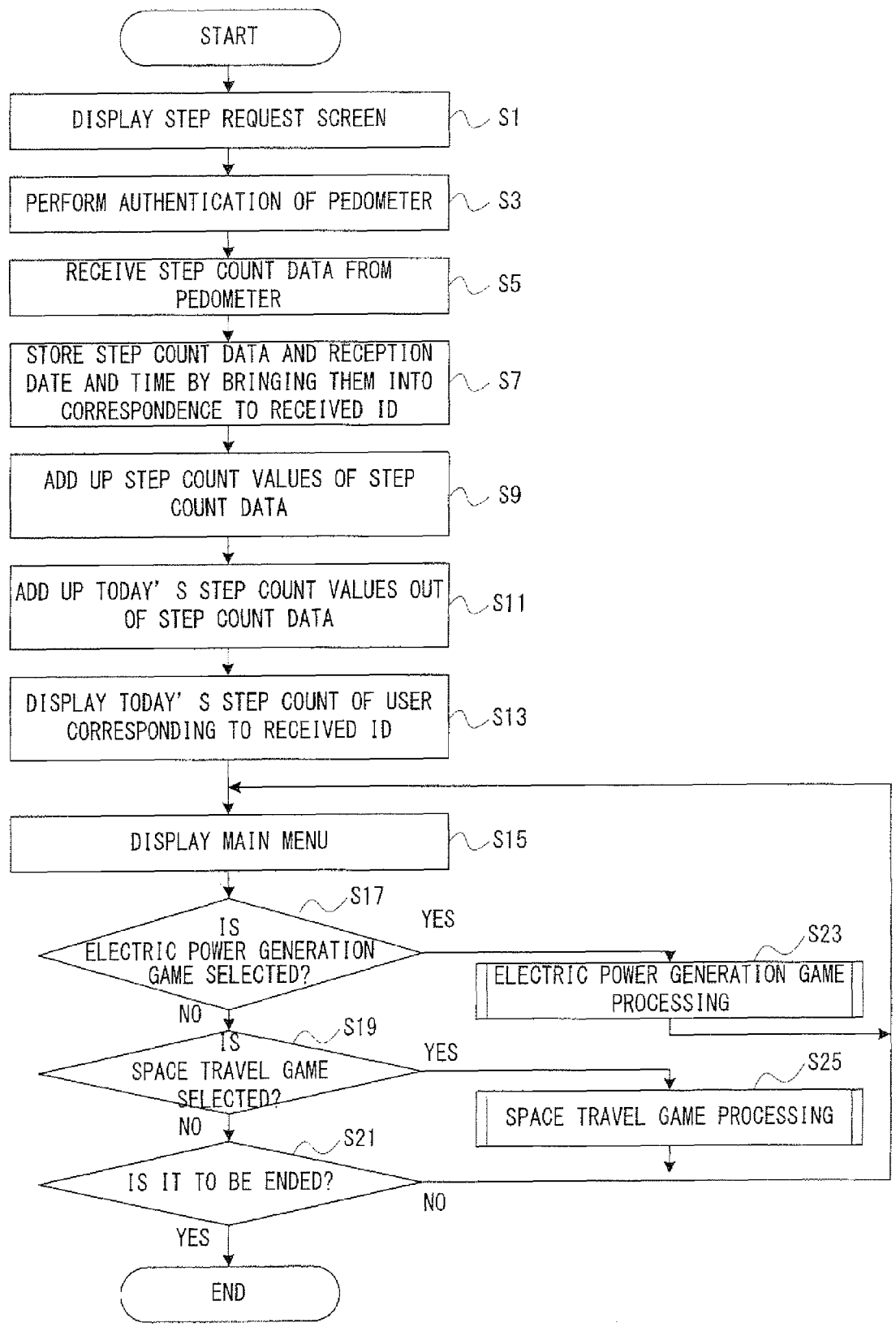
FIG. 8 is a flowchart showing one example of an operation of the game apparatus.

FIG. 8 shows one example of an operation of the game apparatus 10. Before starting each game, the step count data accumulated in the pedometer 100 is first acquired. More specifically, in a step S1, the CPU core 34 of the game apparatus 10 displays a step count requesting screen (not illustrated).

Additionally, when displaying the screen, the CPU core 34 generates the image data in the VRAMs 52 and 54 by utilizing the GPUs 44 and 46, and displays the screens on the LCDs 12 and 14 by utilizing the LCD controller 50 as described above.

On the step count requesting screen, pushing the push button 104 of the pedometer 100 to make a communication with the game apparatus 10 is required to the user. The user has to press the push button 104 with the communication port 108 of the Ir communication circuit 118 of the pedometer 100 faced toward the communication port (not illustrated) of the Ir communication circuit 70 of the memory card 28.

The CPU core 34 performs authentication of the pedometer 100 in a step S3. More specifically, the CPU core 34 sets the Ir communication circuit 70 to a reception standby state by utilizing the microcomputer 66 of the memory card 28. When the user presses the push button 104 of the pedometer 100, the pedometer 100 sends data including the ID. When receiving the data from the pedometer 100, the CPU core 34 extracts the ID from the reception data, and determines whether or not the ID is stored in the registration information memory area 310. If the ID is the registered ID, acquiring the step count data is performed.

When it is confirmed that this is the registered pedometer 100, the CPU core 34 receives the step count data from the pedometer 100 in a step S5. At this time, the CPU core 34 transmits data for requesting step count data from the current date and time to the reception date and time of the memory area 314 to the pedometer 100 via the microcomputer 66 and the Ir communication circuit 70. Since the pedometer 100 transmits the step count data in response to this request, the CPU core 34 receives the step count data from the pedometer 100 via the Ir communication circuit 70 and the microcomputer 66.

In a succeeding step S7, the CPU core 34 stores the received step count data in the memory area 312 by bringing it into correspondence to the received ID, and stores the reception date and time in the memory area 314 by bringing it into correspondence to the received ID. Furthermore, the step count data and the reception date and time are stored in the backup memory 68 by bringing them into correspondence to the ID. Here, in this embodiment, since the step count data received from the pedometer 100 subsequently records step count values per unit of time, the CPU core 34 grasps the date and time when each of the step count values is counted, from the alignment of the reception date and time and each step count value, and stores the date and time by bringing it into correspondence to each step count value.

Succeedingly, the CPU core 34 adds up the step count values of the step count data in a step S9. As described above, since the step count values per unit of time are recorded in the step count data of this embodiment, the total of the step count values recorded in the received step count data is calculated, and this total of the step count values is stored in the memory area 316. Here, the total of the step count values is transmitted to the server 202 in the space travel game processing.

In addition, in a step S11, the CPU core 34 adds up the today's step count values out of the step count data. In the acquired step count data, since the step count value from the current reception date and time to the previous reception date and time is recorded, step count values counted today out of the recorded step count values are specified, and the total of these is calculated.

In a succeeding step S13, the CPU core 34 displays the today's step count of the user corresponding to the received ID. For example, the today's step count is displayed together with the user name and the character image corresponding to the received ID.

Then, in a step S15, the CPU core 34 displays a main menu. On the main menu screen (not illustrated), buttons for designating the electric power generation game, the space travel game, and the end, for example, are displayed. In succeeding steps S17-S21, it is determined which button is selected. The processing corresponding to the selected button is executed. Here, the determination of the selected button is performed on the basis of the coordinate data detected by the touch panel 24 or the operation data of the operating switch 22 and the display position data of each of the buttons stored in advance.

Figure 11:
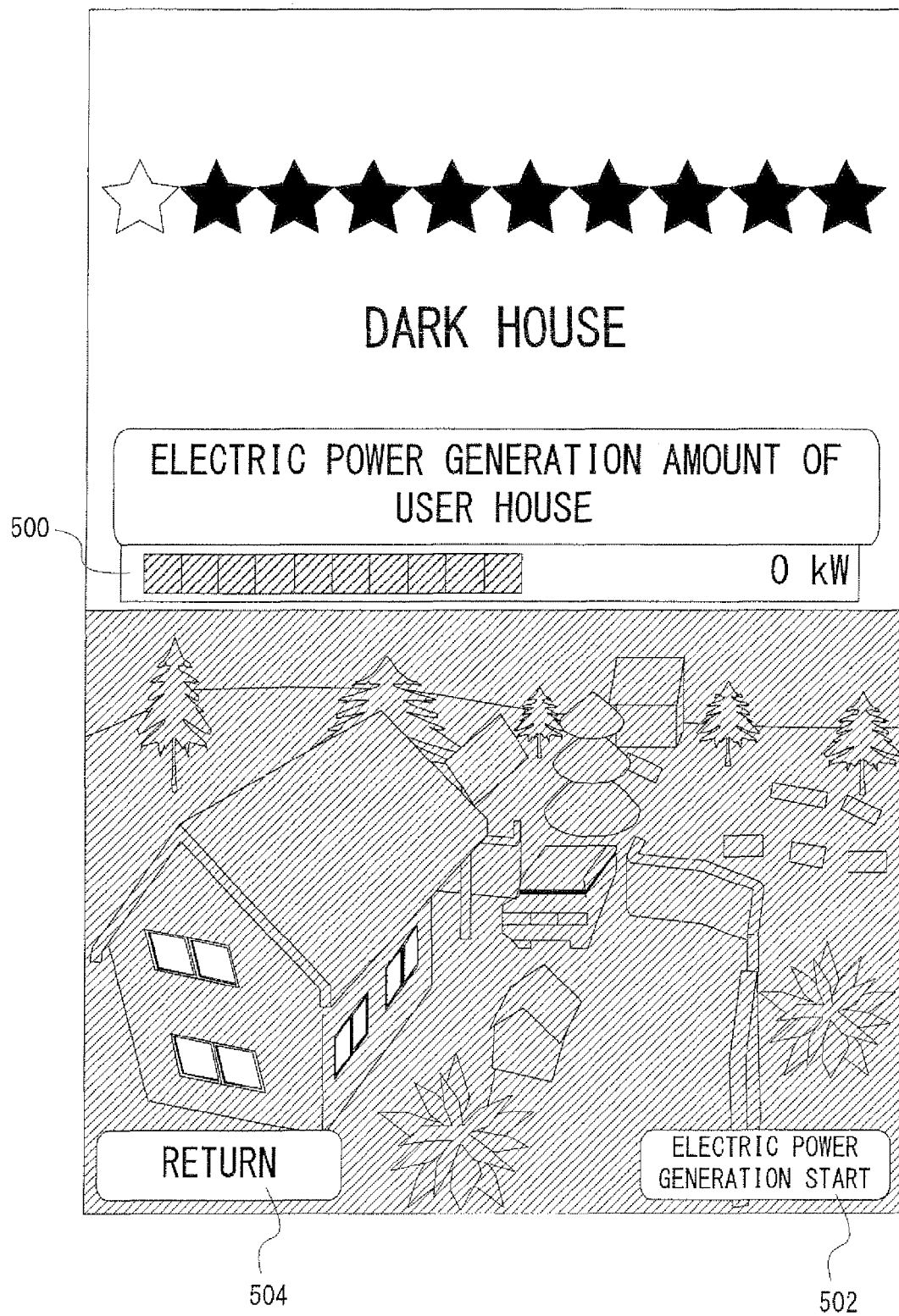
FIG. 11 is an illustrative view showing one example of an initial screen of the electric power generation game.

More specifically, in the step S17, the CPU core 34 determines whether or not the button of the electric power generation game is selected. If "YES", the CPU core 34 executes the electric power generation game processing in a step S23. The operation of the electric power generation game processing is shown in FIG. 9 and FIG. 11 described later.

Figure 17:
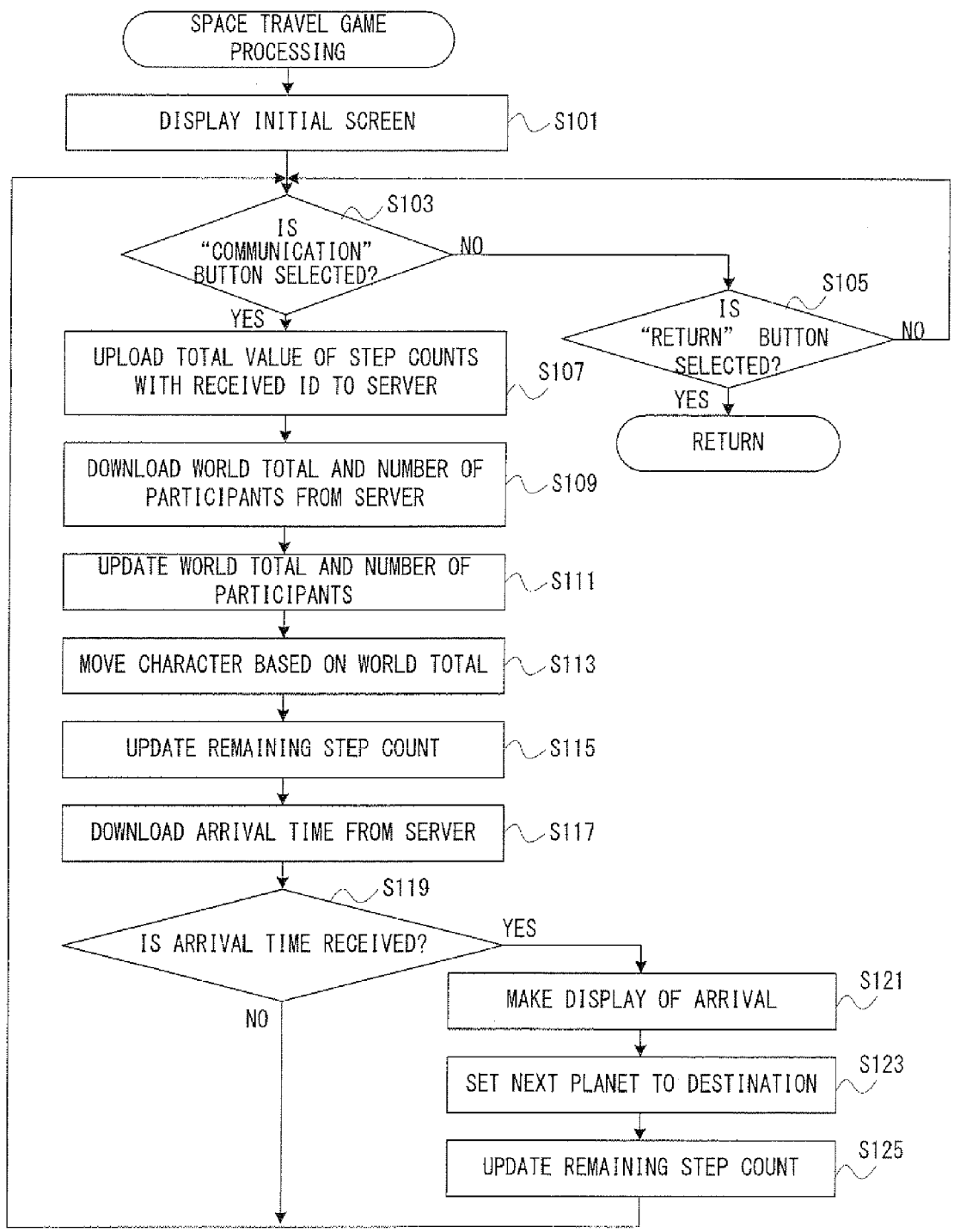
FIG. 17 is a flowchart showing a part of the one example of space travel game processing in FIG. 8.

On the other hand, if "NO" in the step S17, the CPU core 34 determines whether or not the button of the space travel game is selected in the step S19. If "YES", the CPU core 34 executes the space travel game processing in a step S25. The operation of the space travel game processing is shown in FIG. 17 described later.

Additionally, if "NO" in the step S19, the CPU core 34 determines whether or not the end button is selected in the step S21, and if "YES", the CPU core 34 ends the processing. Alternatively, if "NO" in the step S21, or if the step S23 or the S25 is ended, the process returns to the step S15.

Figure 9:
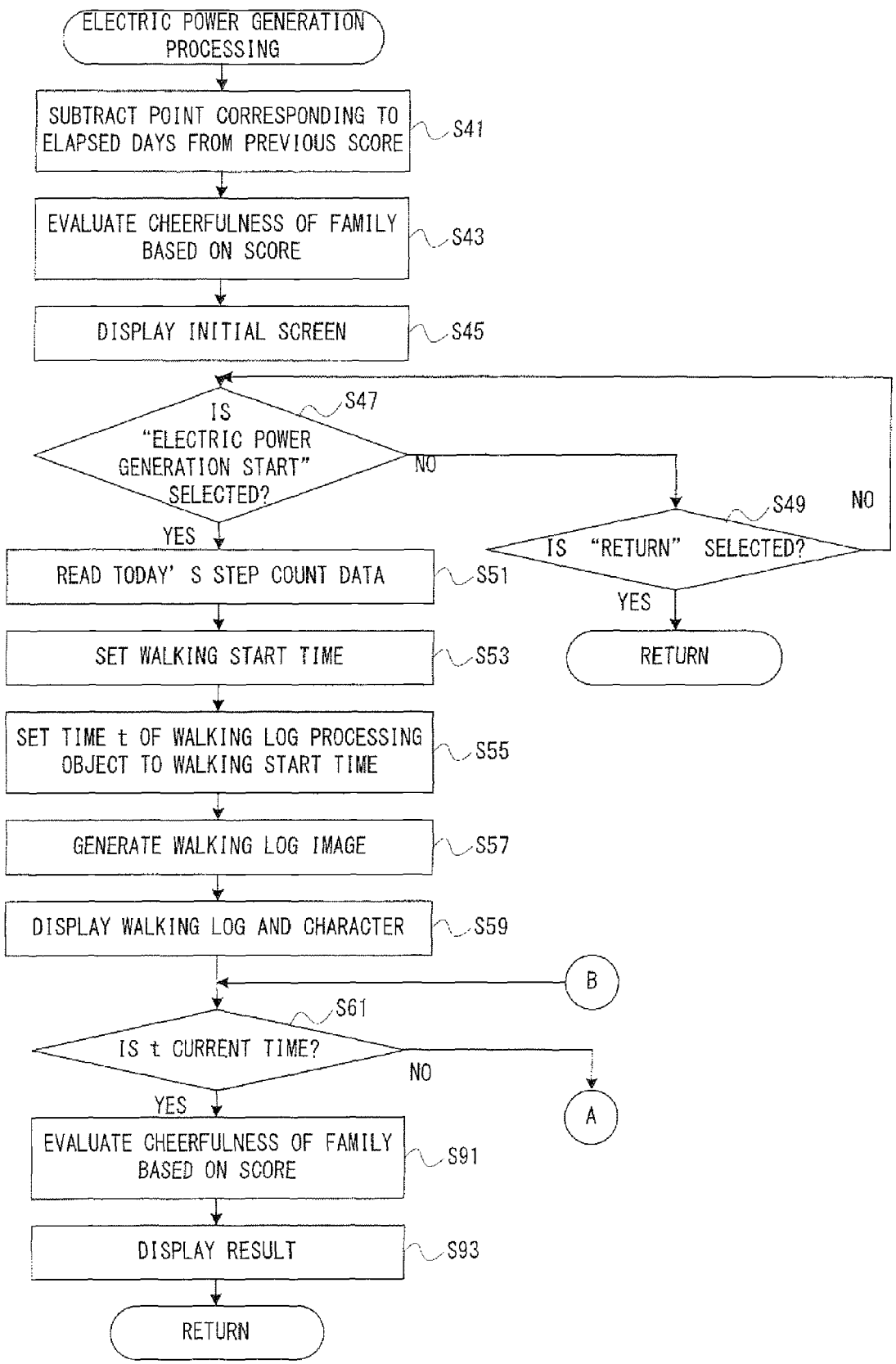
FIG. 9 is a flowchart showing a part of the one example of an electric power generation game processing in FIG. 8.
Figure 10:
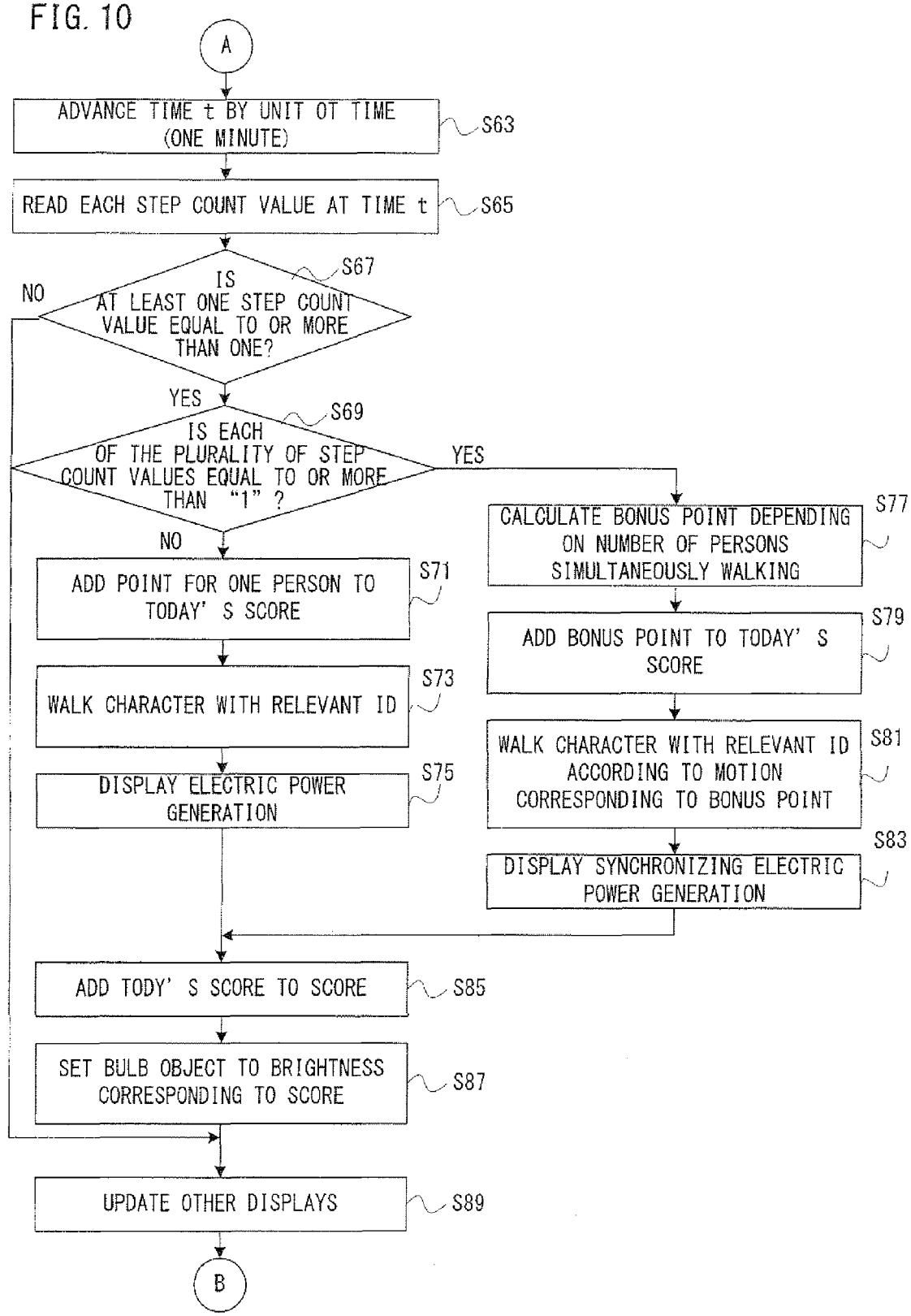
FIG. 10 is a flowchart showing a sequel of FIG. 9.

FIG. 9 and FIG. 10 show one example of an operation of the electric power generation game processing. The electric power generation game is a game played by the user registered in the game apparatus 10 by replacing the time during which each user walks all day with a score (electric power generation amount).

When the electric power generation game processing is started, the CPU core 34 subtracts the point corresponding to the elapsed days from the previous score in a step S41. The elapsed day is calculated on the basis of the date and the current date and time stored with the previous score. Furthermore, depending on the number of registered persons of the game apparatus 10 (the number of registered pedometers 100), the point to be subtracted is changed. For example, the point to be subtracted per head per day (electric power consumption amount) is set to 250 kW.

Next, in a step S43, the CPU core 34 evaluates cheerfulness of the family on the basis of the score. For example, the score is 10000 kW at a maximum, and brightness is evaluated by ten levels.

Then, in a step S45, the CPU core 34 displays an initial screen of the electric power generation game. One example of this initial screen is shown in FIG. 11. When the screens are illustrated, the upper and lower screens which respectively are displayed on the LCD 12 and 14 are vertically arranged.

On the upper screen, the electric power generation amount of the user family and its evaluation are displayed. More specifically, at the lower part of the upper screen, a gauge for electric power generation 500 for indicating an electric power generation amount of the user family is displayed, and at the center thereof, an evaluation of the cheerfulness of the family is displayed. The scale image of the gauge for electric power generation 500 indicates an electric power generation amount by changing its color from one color to another by the length corresponding to the electric power generation amount from the left end.

In FIG. 11 an electric power generation amount is 0 kW as one example. The scale image of the gauge for electric power generation 500 is entirely displayed by an initial color so as to indicate 0 kW. Furthermore, as an evaluation of that case, a character saying "dark house" which means the lowest level is represented, one star at the left edge out of ten stars for indicating the evaluation level is shown by a predetermined color being different from the others.

Furthermore, on the lower screen, various objects showing a house of the user and a cityscape are displayed, and buttons 502 and 504 are shown as a menu. The button 502 is an "electric power generation start" button, and is for calculating the electric power generation amount on the basis of the received step count data and commanding the start of the game processing. The button 504 is a "return" button, and is for commanding the end of the electric power generation game and the return to the main menu.

The CPU core 34 determines which button is selected in succeeding steps S47-S49. More specifically, the CPU core 34 determines whether or not the "electric power generation start" is selected in the step S47, and determines whether or not the "return" is selected in the step S49. If "YES" in the step S49, this electric power generation game processing is ended.

If "YES" in the step S47, that is, if the "electric power generation start" is selected, the electric power generation game based on one-day-family-member's walking is executed. In the electric power generation game, a temporal change of one-day's walking of each user is displayed by images, such as a walking record, a character, etc. then, the electric power generation amount is increased according to the family member's walking, and the cheerfulness of family is finally evaluated.

More specifically, the CPU core 34 reads today's step count data into the RAM 42 in a step S51. With respect to the received ID, the step count data is acquired in the memory area 312. Furthermore, since the electric power generation game is for evaluating the brightness from the one-day's walking time of the family members, step count data with the other's IDs except for the received ID are also read. More specifically, with respect to the other's IDs, if the today's step count data is stored with reference to the backup memory 68, that is, if the reception date and time indicates today, the step count data is read.

Succeedingly, in a step S53, the CPU core 34 sets a walking start time. More specifically, in all the read-out step count data, the time when the step count value becomes first equal to or more than 1 (one) from the start of today is detected. Additionally, in the step count data, the step count value per unit of time is recorded, and therefore, the time or the hour here means an interval having a length of the unit of time, that is, a time zone or slot. Furthermore, the one day of this game in the embodiment is defined as a time from 3:00 a.m. to 2:59 a.m. on the next day, for example, but is appropriately changeable. In addition, in this embodiment, for representation, a display is made a predetermined time before the user actually starts to walk, and therefore, the time predetermined time before from the detected time is set as a walking start time.

In a step S55, the CPU core 34 sets the time t of the processing object to a walking start time. In this electric power generation game, an electric power generation is performed while times of the record (log) of one day's walking of the family members are successivley advanced per unit of time, and therefore, the time of the processing object is set in this step S55.

In a step S57, the CPU core 34 produces a walking log image of each user on the basis of the step count data. The walking log image is for representing the presence or absence of walking from the walking start time to the reception date and time for each hour, and is represented in a band or belt shape taking the time as an axis (see FIG. 12). For example, one minute being a unit of time for recording the step count value in this embodiment is set to the width of one dot. The color of the time when more than one step counts are recorded is set to a predetermined color indicating the presence of walking for each user while the color of the time when the step count value is 0 (zero) is set to a predetermined color indicating the absence of walking. In the walking log image of the user whose today's step count data has not been acquired yet, the predetermined color indicating the absence of walking is set at all hours.

Figure 12:
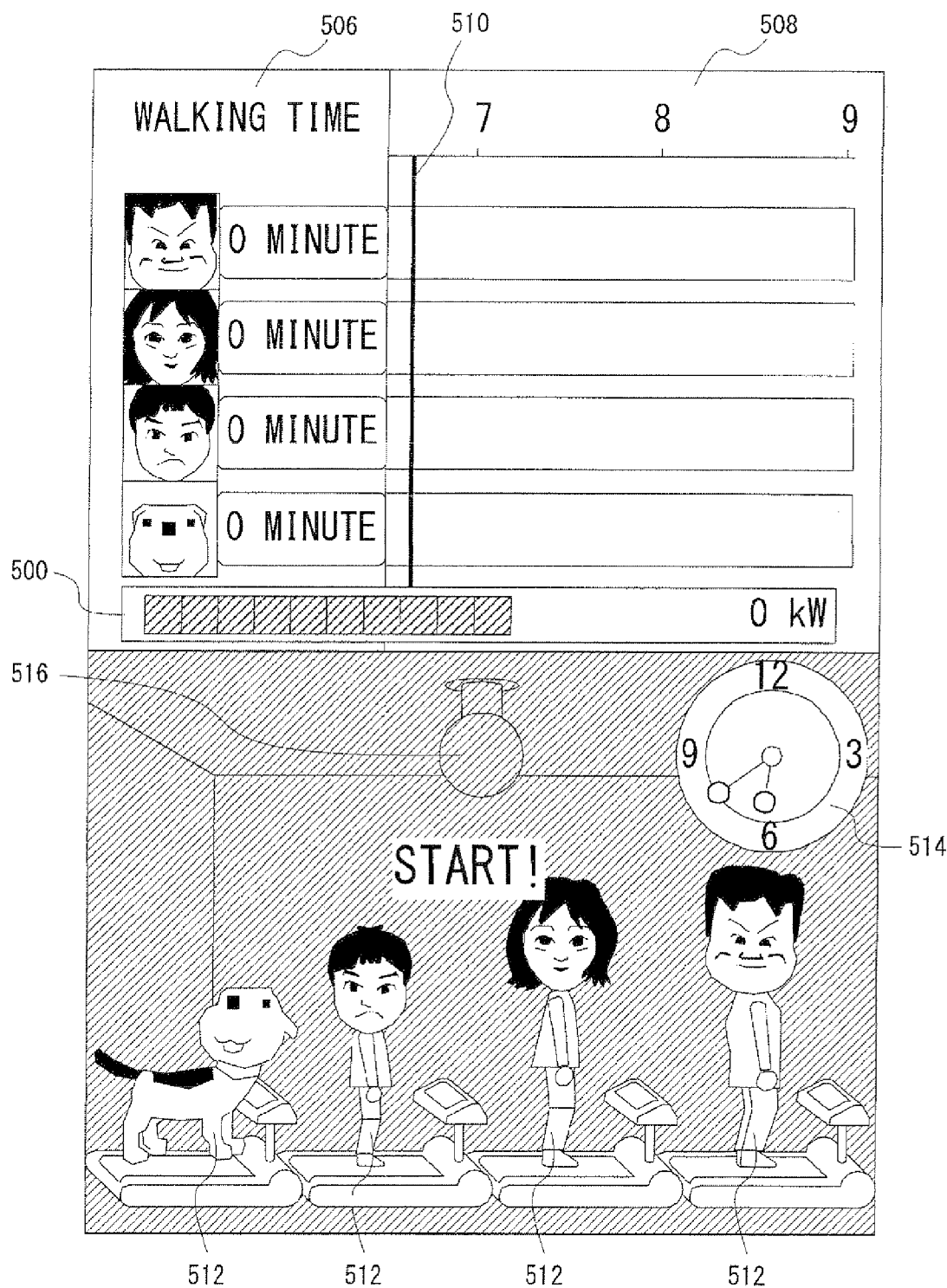
FIG. 12 is an illustrative view showing one example of a screen when electric power generation is started.

In a step S59, the CPU core 34 displays walking log images and characters. Thus, an electric power generation starting screen shown in FIG. 12 is displayed. On the upper screen, a field 506 for representing faces of the characters of the respective users and walking times is provided at the left end portion, and a field 508 for representing walking log images is provided at the right of the field 506. In the field 508, a predetermined time from the walking start time out of the walking log image is selected as a display range. Furthermore, at the left end of the field 508, an electric power generation bar 510 is provided. In the electric power generation game, the walking log images are scrolled to the left in accordance with the progress of the time in the walking log, and when the time of the presence of walking reaches the position of the electric power generation bar 510, electric power generation occurs. That is, the electric power generation bar 510 also indicates a time as the walking log processing object. FIG. 12 shows an initial screen when the electric power generation is stared, and therefore, the time as a processing object is set to a time immediately before the walking start time.

Furthermore, a character 512 corresponding to each user is displayed on the lower screen. As one example, each character 512 rides on a treadmill or running machine, and is ready to walk. Furthermore, a clock 514 is displayed at the upper right of the lower screen, and the time indicated by the clock 514 is a time to be processed as the walking log processing object, and corresponds to the time of the electric power generation bar 510 on the upper screen. Furthermore, on the ceiling of the room, a bulb object 516 is displayed. The bulb object 516 represents the brightness corresponding to the electric power generation amount of the gauge for electric power generation 500. In FIG. 12, the electric power generation amount is 0 kW, the bulb object 516 is light off, and thus, the room shown in the lower screen is represented darkly as a whole.

The initial screen when the electric power generation is started as shown in FIG. 12 is displayed, and then, the electric power generation is performed while the time as the walking log processing object is successivley progressed to the current time (reception date and time).

More specifically, in a step S61, the CPU core 34 determines whether or not the processing object time t is the current time (reception date and time). If "NO" in the step S61, the process proceeds to a step S63 shown in FIG. 10. The processing shown in FIG. 10 is repeated until "YES" is determined in the step S61, that is, the processing object time t reaches the reception date and time.

In the step S63 shown in FIG. 10, the CPU core 34 advances the processing object time t by the unit of time. In this embodiment, a step count value for each minute is recorded in the step count data, and therefore the t is advanced by one minute. Succeedingly, in a step S65, the CPU core 34 reads each step count value at the time t from the step count data with the received ID and the step count data with the other's ID.

Then, in a step S67, the CPU core 34 determines whether or not at least one step count value is equal to or more than 1 (one). That is, it is determined whether or not any one of the users walks. If "NO" in the step S67, that is, if neither user walks at this time, the process directly proceeds to a step S89.

On the other hand, if "YES" in the step S67, the CPU core 34 determines whether or not each of the plurality of step count values is equal to or more than 1 (one) in a step S69. That is, it is determined whether or not two or more users walk. If "NO" in the step S69, that is, if only one user walks at the time t, an electric power generation corresponding to one person's walking is performed. More specifically, the CPU core 34 adds a point for one person to the today's score in a step S71. The point for one person per unit of time, that is, an electric power generation amount is decided in advance to a predetermined value (20 kW, for example).

Figure 13:
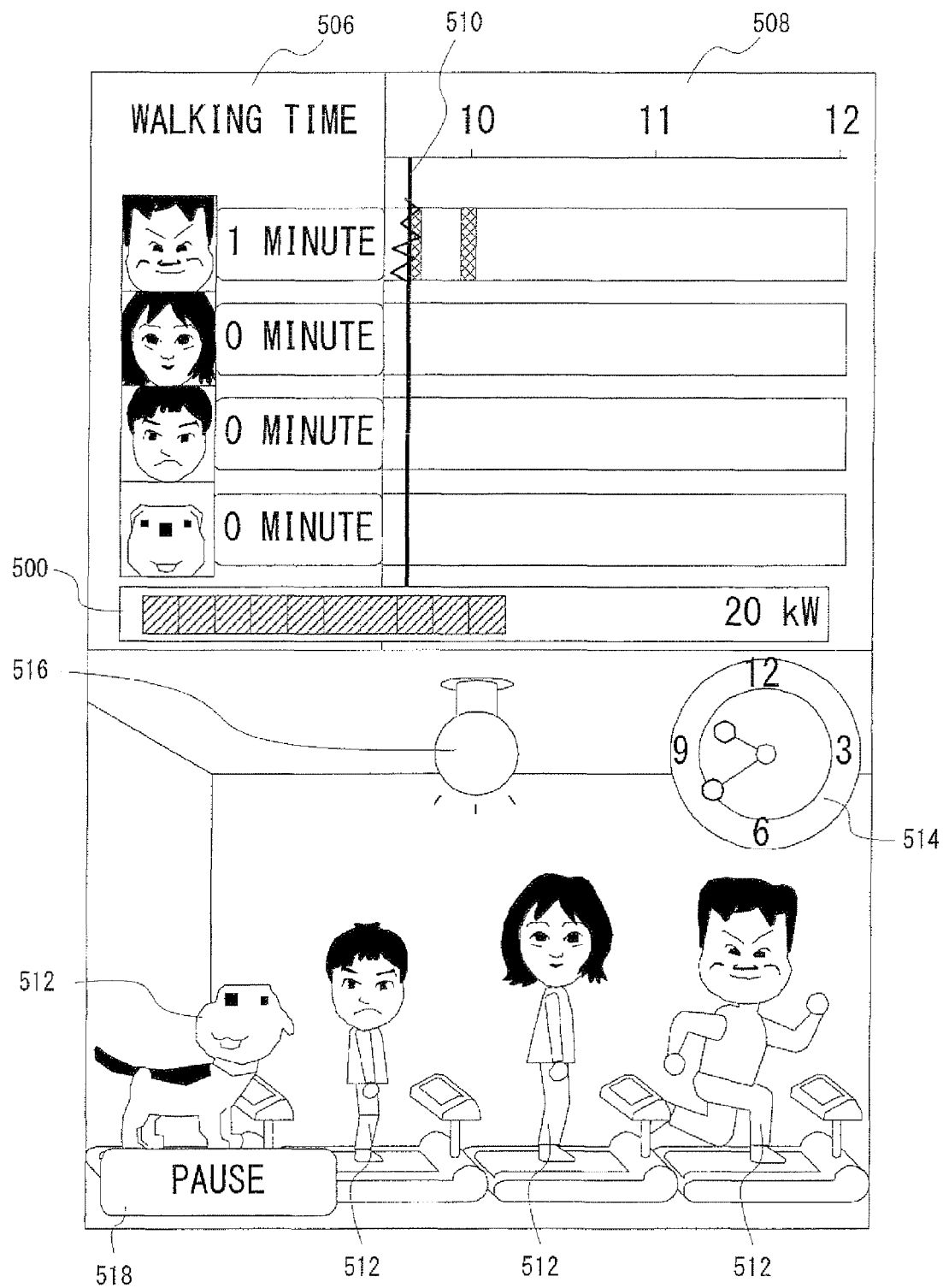
FIG. 13 is an illustrative view showing one example of a screen when only one user walks.

Furthermore, in a step S73, the CPU core 34 walks the character 512 with the relevant ID. That is, the motion is controlled such that the character 512 corresponding to the user who actually walks at the walking log processing object time t is walked. FIG. 13 shows one example of a screen in this case. Since the step count value corresponding to the character 512 at the right end of the lower screen is equal to or more than 1 (one), an image in which the character 512 at the right end walks is shown on the lower screen.

In addition, in a step S75, the CPU core 34 makes a display the electric power generation. By the representation other than the motion of the character 512, that an electric power generation corresponding to a single walk is performed is shown on the screen. FIG. 13 shows a case that the step count value of the user arranged at the uppermost of the walking logs on the upper screen is equal to or more than 1 (one). At the position of the electric power generation bar 510, the walking log image of the user is shown by a predetermined color, and this can be show that the user walks at the walking log processing object time t. In the walking log image of the user, an image of sparks is displayed at the position of the electric power generation bar 510, and electric power generation is thus represented.

On the other hand, if "YES" in the step S69, that is, if two or more users walk at the processing object time t, the CPU core 34 calculates a bonus point depending on the number of persons simultaneously walking in a step S77. The bonus point is calculated by electric power generation amount for one person per unit of time × (by) the number of persons simultaneously walking × (by) synchronization magnification. Here, the synchronization magnification is a coefficient decided in advance depending on the number of persons simultaneously walking. For example, if the number of persons is 2, 3 and 4, the synchronization magnification is set to 2, 3 and 4 corresponding thereto. Accordingly, in comparison with the single walking, the electric power generation amount obtained when two persons simultaneously walk is four times, and when three persons simultaneously walk, nine times, and when four persons simultaneously walk, sixteen times. Accordingly, by walking in cooperation with one another, such as simultaneously walking a plurality of players and walking in the same time zone or slot, more points can be gained. Then, in a step S79, the CPU core 34 adds the bonus point to the today's score.

Figure 14:
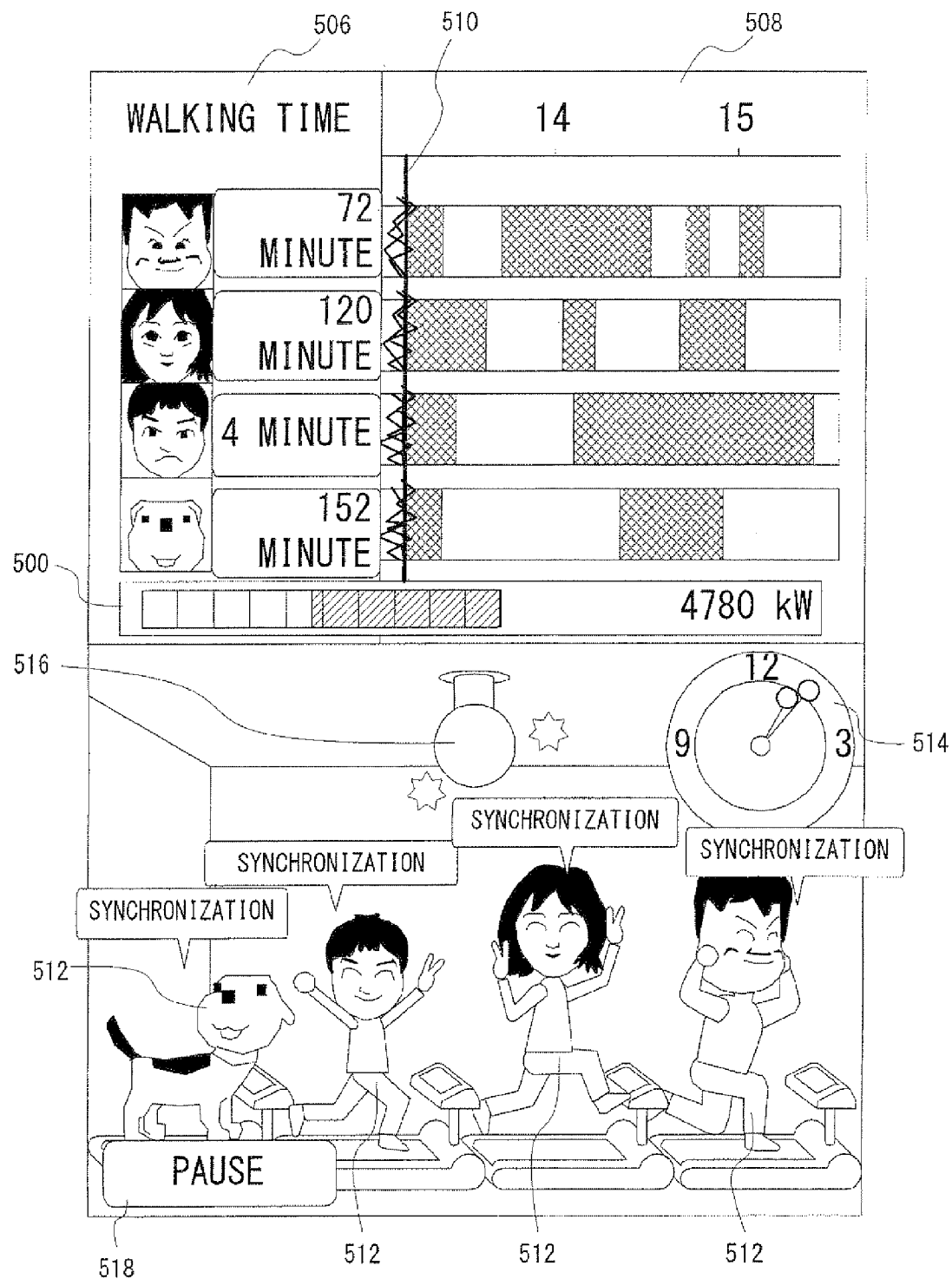
FIG. 14 is an illustrative view showing one example of a screen when four users walk at the same time or hour.

Furthermore, in a step S81, the CPU core 34 walks the character 512 with the relevant ID by a motion corresponding to the bonus point. That is, the motions of the plurality of characters 512 of the plurality of users simultaneously walking are controlled. FIG. 14 shows one example of a screen of this case. FIG. 14 shows a case that four users simultaneously walk, and an image in which four characters 512 walk is displayed on the lower screen. In addition, a walking motion of each character 512 is changed depending on the number of persons simultaneously walking. For example, an expression of the face, a swing of the arms, a motion of the feet are controlled so as to become large or flamboyant as the number of persons is more.

In addition, in a step S83, the CPU core 34 displays a synchronizing electric power generation. By the representation of the motion other than the motion of the character 512, that electric power generation corresponding to simultaneous walking of a plurality of users is performed is displayed on the screen. In FIG. 14, at the position of the electric power generation bar 510, the walking log images of all the users are shown by predetermined colors, and this can show that all the users walk at the walking log processing object time t. At the position of the electric power generation bar 510 of all the walking log images, images (sparks) showing an electric power generation are displayed. These sparks may be a different type depending on the number of persons simultaneously walking. Furthermore, on the lower screen, a character of "synchronization" is displayed at the head of each of the characters 512 who simultaneously walks by a speech balloon, this can show the simultaneous walk by a plurality of users by the character.

In a succeeding step S85, the CPU core 34 adds a today's score to the score of the memory area 318. Then, in a step S87, the CPU core 34 sets the bulb object 516 to the brightness corresponding to the score. That is, the brightness and the color of the bulb object 516 are controlled by the score to which points are added by the single walk and the simultaneous walk. On the screen showing a single walk in FIG. 13, the electric power generation amount is 20 kW, the bulb object 516 is displayed by a predetermined color such that it is slightly lighted tip, and the brightness of the room is made brighter than that in FIG. 12. Furthermore, in FIG. 14 showing a four person simultaneous walk, the electric power generation amount is 4780 kW, the bulb object 516 is displayed by a brighter color, and the room is made brighter than that in FIG. 13.

Furthermore, in a step S89, the CPU core 34 updates other displays. More specifically, on the upper screen, the electric power generation amount and the scale image of the gauge for electric power generation 500 are updated according to the scores. Furthermore, the walking time of each user is updated, and the walking log images are scrolled in the left direction. On the lower screen, the clock 514 is updated to the walking log processing object time t.

After completion of the step S89, the process returns to the step S61 in FIG. 9. In this manner, the electric power generation game is advanced according to the one day's walking of the plurality of registered users. It should be noted that at the lower left of the lower screen of FIG. 13 and FIG. 14, the pause button 518 is provided. Although omitted in the flowchart shown in FIG. 9 and FIG. 10, when the pause button 518 is selected, the progress of the electric power generation game (progress of the processing object time) is stopped until the button 518 is selected again. Additionally, this pause button 518 may become operative at a time of replay.

Then, if "YES" in the step S61 shown in FIG. 9, that is, if the electric power generation game based on the one day's walking is to be ended, the CPU core 34 evaluates cheerfulness of the family on the basis of the score of the memory area 318 in a step S91. As described above, the score, that is, the electric power generation amount is 10000 kW at a maximum, and the cheerfulness of the family is evaluated by ten levels on the basis of the electric power generation amount.

Figure 15:
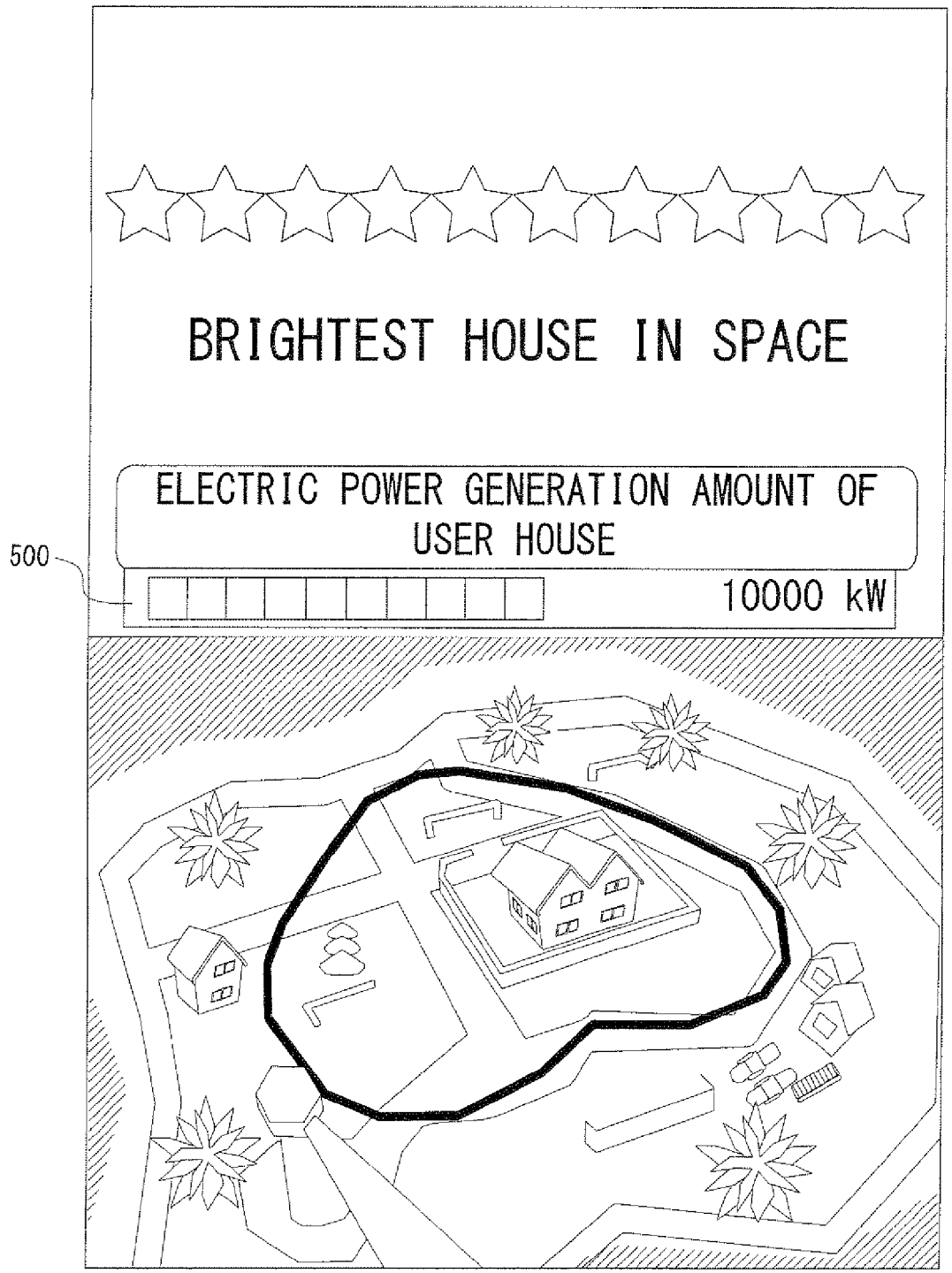
FIG. 15 is an illustrative view showing one example of a result screen.

Then, in a step S93, the CPU core 34 displays the result of the evaluation. FIG. 15 shows one example of the screen of the evaluation result. This shows a case that the score is 10000 at a maximum, and in the gauge for electric power generation 500 on the upper screen, the electric power generation amount is shown by this numerical value and scale image. Furthermore, at the center of the upper screen, the evaluation of the cheerfulness of the family is shown, and because of the highest level in this example, a character of "the brightest house in the space" and ten star marks which are changed to a predetermined color are displayed. On the lower screen, for example, the landscape of the neighbor including the house of the user is displayed by the brightness in correspondence to the evaluation result. After completion of the step S93, this electric power generation game processing is ended, and the process is returned to the step S15 in FIG. 8.

Additionally, in this embodiment, as described above, if any step count value out of those of all the users is equal to or more than 1 (one), electric power generation is performed while if step count values of tow or more users are equal to or more than 1 (one), synchronizing electric power generation is performed. However, in another embodiment, only when the step count value of the user with the received ID is equal to or more than 1 (one), electric power generation is performed, and if the step count value of another user is equal to or more than 1 (one), synchronizing electric power generation may be performed. That is, in this embodiment, electric power generation is performed by regarding all the users as players at the same level, but in another embodiment, by regarding the user with the received ID as a main player and the other users as sub-players, the electric power generation may be performed in cooperation with the other users who walk in the same time slot. In that case, in place of the operation in FIG. 10, an operation shown in FIG. 16 may be executed, for example. Additionally, in FIG. 16, the same reference numerals are given to the processing the same or similar to those in FIG. 10, and the explanation thereof is omitted.

Figure 16:
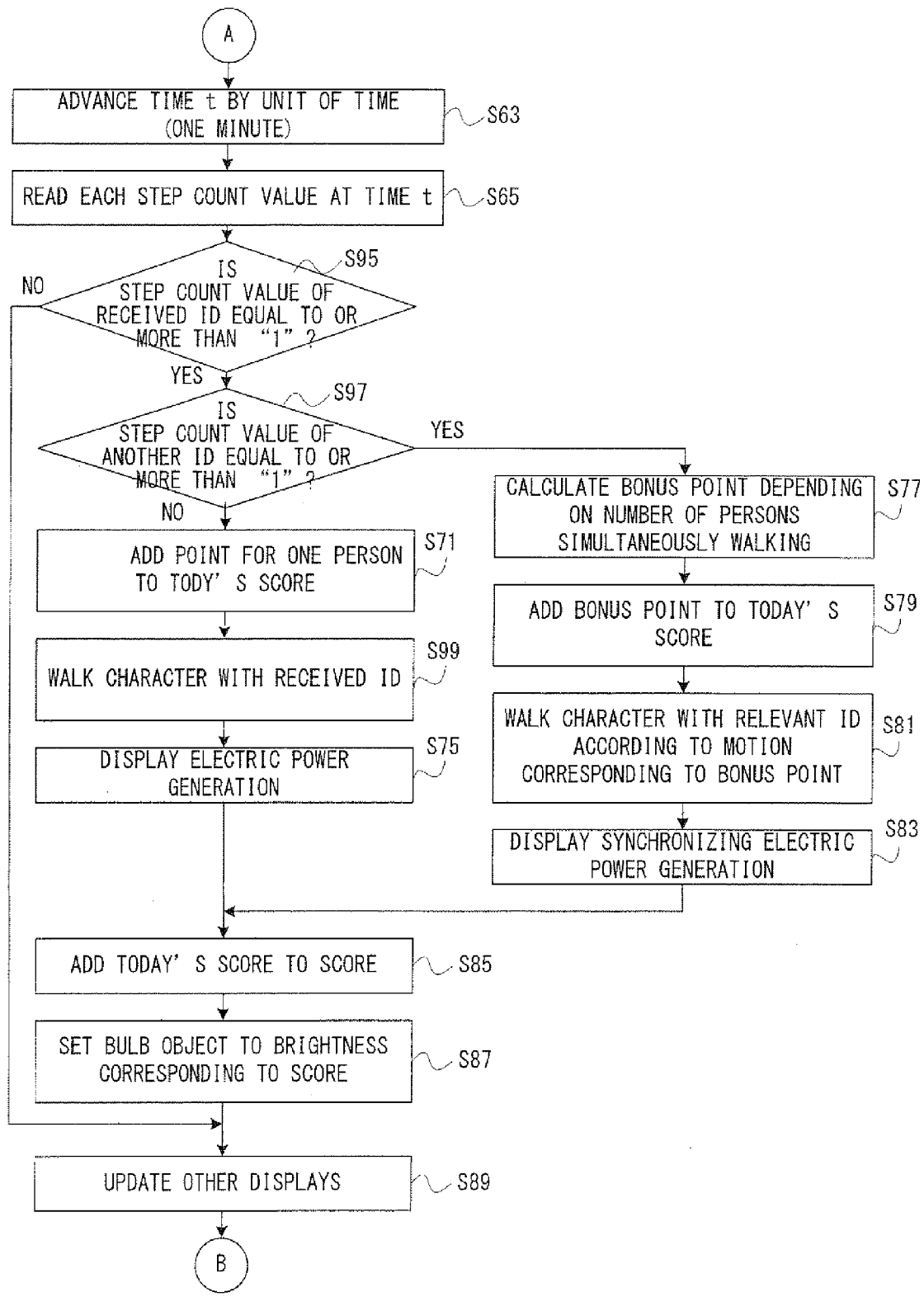
FIG. 16 is a flowchart showing a modified example of a sequel of FIG. 9.

After completion of the step S65 in FIG. 16, in a step S95, the CPU core 34 determines whether or not the step count value of the received ID is equal to or more than 1 (one). If "NO" in the step S95, that is, if the user with the received ID does not walk at this time, the process directly proceeds to the step S89.

On the other hand, if "YES" in the step S95, the CPU core 34 determines whether or not the step count value of another ID is equal to or more than 1 (one) in a step S97. If "NO" in the step S97, that is, if only the user with the received ID walks at the time t, the processing proceeds to the step S71 to perform electric power generation corresponding to the walking by one person. In a succeeding step S99, the CPU core 34 walks the character 512 with the received ID. On the other hand, if "YES" in the step S97, that is, if another user walks with the user with the received ID at the same time or hour, the process proceeds to the step S77 to thereby perform electric power generation corresponding to the number of persons simultaneously walking.

Figure 18:
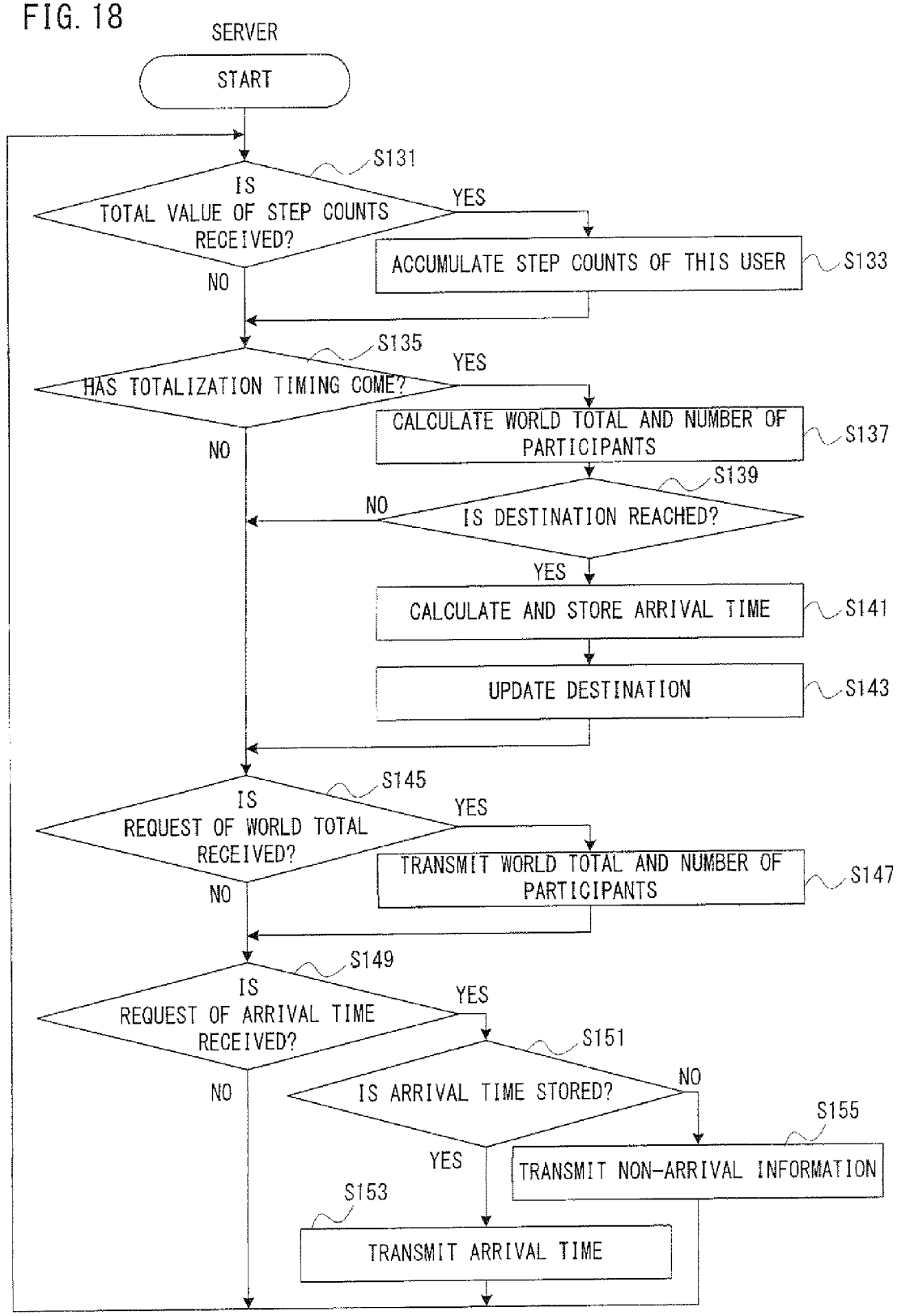
FIG. 18 is an illustrative view showing one example of an operation of the server.

FIG. 17 shows one example of an operation of the space travel game processing in the game apparatus 10. The space travel game is to be played by utilizing not only by the step count data of the user registered in one game apparatus 10, but also the step count data of the users registered in the plurality of game apparatuses 10. More specifically, this is a game for reaching a destination set in the space by totalizing accumulated step count values of a plurality of users. The space travel game in this embodiment is executed in a game system 200 including a plurality of game apparatuses 10 and a server 202. The step count data acquired from the plurality of game apparatuses 10 are transmitted to the server 202, and in the server 202, a predetermined arithmetic operation is performed by utilizing the plurality of step count data. Then, in each game apparatus 10, the game is performed on the basis of the result of the arithmetic operation of the server 202. Thus, in the server 202, a predetermined arithmetic operation is performed by utilizing the plurality of step count data acquired from the plurality of game apparatuses 10 is performed, and therefore, it is possible to reduce processing load on each of the game apparatuses 10. Furthermore, the server 202 can acquire step count data from a number of game apparatuses 10 including a game apparatus 10 of a person who lives far away and a unknown person for the user of a certain game apparatus 10, and therefore, in this space travel game, it is possible to provide a way of enjoyment of walking not only with family members, but also with a user of another game apparatus 10, such as an unknown person who lives far away in cooperation with one another. FIG. 18 shows one example of all operation of the space travel game processing in the server 202.

Figure 19:
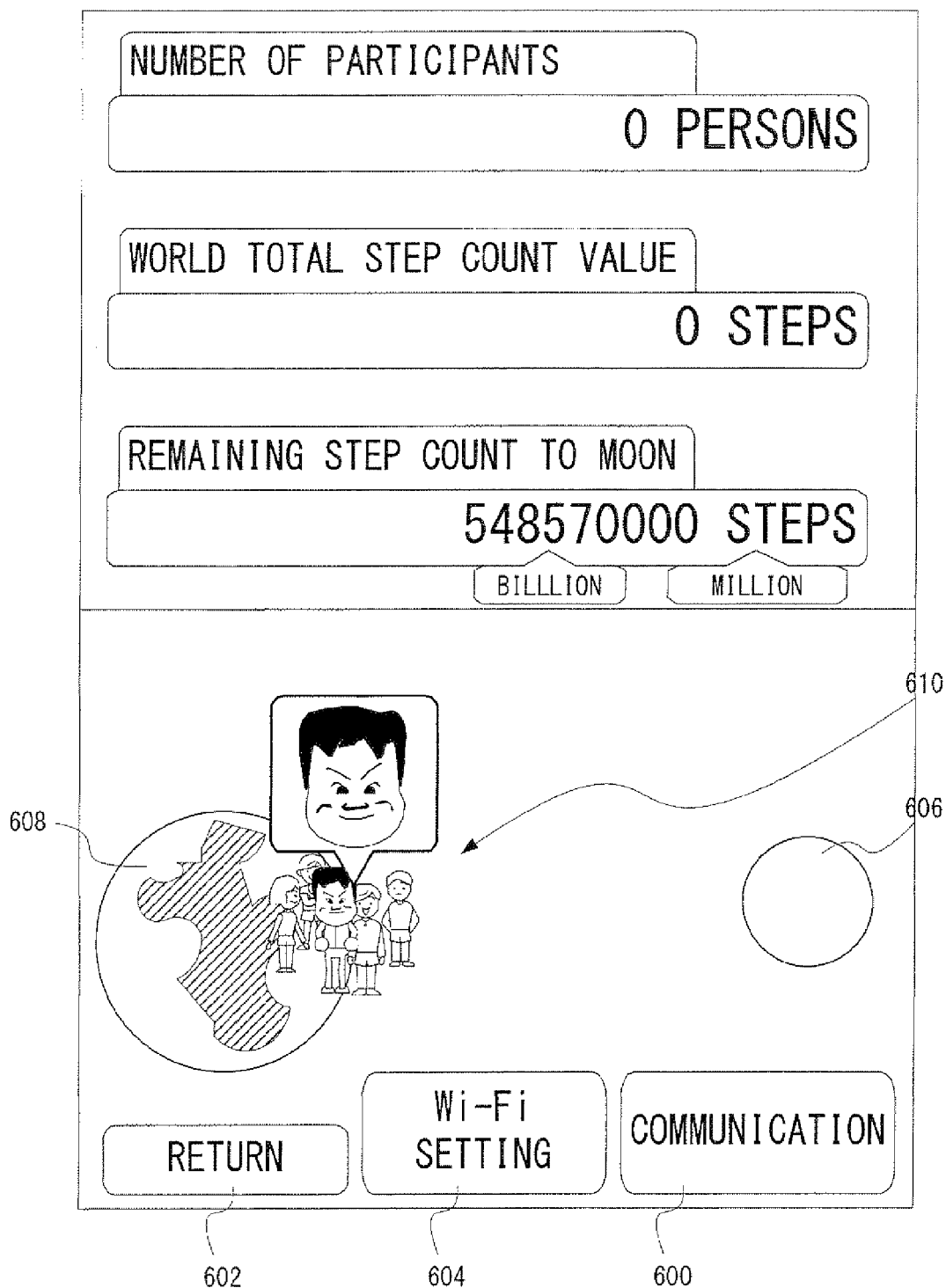
FIG. 19 is an illustrative view showing one example of an initial screen of the space travel game.

When the space travel game processing is started, the CPU core 34 of the game apparatus 10 displays an initial screen of the space travel game in a step S101 shown in FIG. 17. FIG. 19 shows one example of the initial screen. At the lower end of the lower screen, buttons 600, 602 and 604 are provided. The button 600 is a "communication" button and for designating a start of the communication with the server 202. The button 602 is a "return" button and for ending the space travel game and returning to the main menu. Here, the button 604 is a "Wi-Fi setting" button and for performing a setting in relation to the communication with the server 202. In addition, on the lower screen, an object representing a destination 606, an object representing a departure place 608, a character group representing users in the world 610, etc. are displayed. Additionally, in the character group 610, the character corresponding to the user with the received ID is also included, and on the initial screen, the face of this character is displayed in a size-enlarged manner. Furthermore, on the upper screen, the number of participants, the total number of steps of the world and a remaining step count to a destination are displayed. FIG. 19 is screens for first playing of the space travel game, in which initial values thereof are displayed. On the upper screen, the first destination is set to the moon, and the remaining step count is displayed, and on the lower screen, the moon is displayed as an object representing the destination 606. The character group 610 is arranged at a predetermined position of the object 608 representing a departure place (earth).

In succeeding steps S103 and S105, the CPU core 34 determines whether or not any button on the lower screen is selected. That is, in the step S103, the CPU core 34 determines whether or not the "communication" button 600 is selected. Furthermore, in the step S105, the CPU core 34 determines whether or not the "return" button 602 is selected. If "YES" in the step S105, this space travel game processing is ended, and the process returns to the step S15 in FIG. 18. Additionally, in FIG. 17, processing in relation to the button 604 is omitted, but if the button 604 is selected, various settings are performed, and then, the process returns to the screen shown in FIG. 19.

On the other hand, if "YES" in the step S103, that is, if a start of the communication with the server 202 is designated by the user, the CPU core 34 uploads the total value of the step counts of the received ID to the server 202 in a step S107. This total value of the step counts is the total value of the step counts calculated in the step S9 shown in FIG. 8 and stored in the memory area 316. Accordingly, basically, the total of the step count values recorded from the previous reception date and time to the current reception date and time by the pedometer 100 can be transmitted to the server 202.

Here, in this embodiment, the total value of the step counts with the received ID is transmitted to the server 202, but in another embodiment, a total value of the step counts with the ID set in advance may be transmitted. That is, in the setting with the button 604, whether participating to the space travel game or not may be set in advance for each ID, and total values of the step counts of the IDs which are set to the participation may be transmitted. The total value of the step counts of the user which has not been transmitted yet to the server 202 may be stored in the backup memory 68, and may be transmitted in this step S107.

Furthermore, in this embodiment, the total value of the step counts of the acquired step count data is transmitted to the server 202 as step count data, but in another embodiment, another value may be calculated from the acquired step count data and transmitted to the server 202, or the acquired step count data may directly be transmitted to the server 202.

In a succeeding step S109, the CPU core 34 downloads the world total (total number of steps of the world) and the number of participants from the server 202. More specifically, the CPU core 34 transmits a request of the world total and the number of participants to the server 202, and receives the world total and the number of participants transmitted from the server 202 in response thereto.

Figure 20:
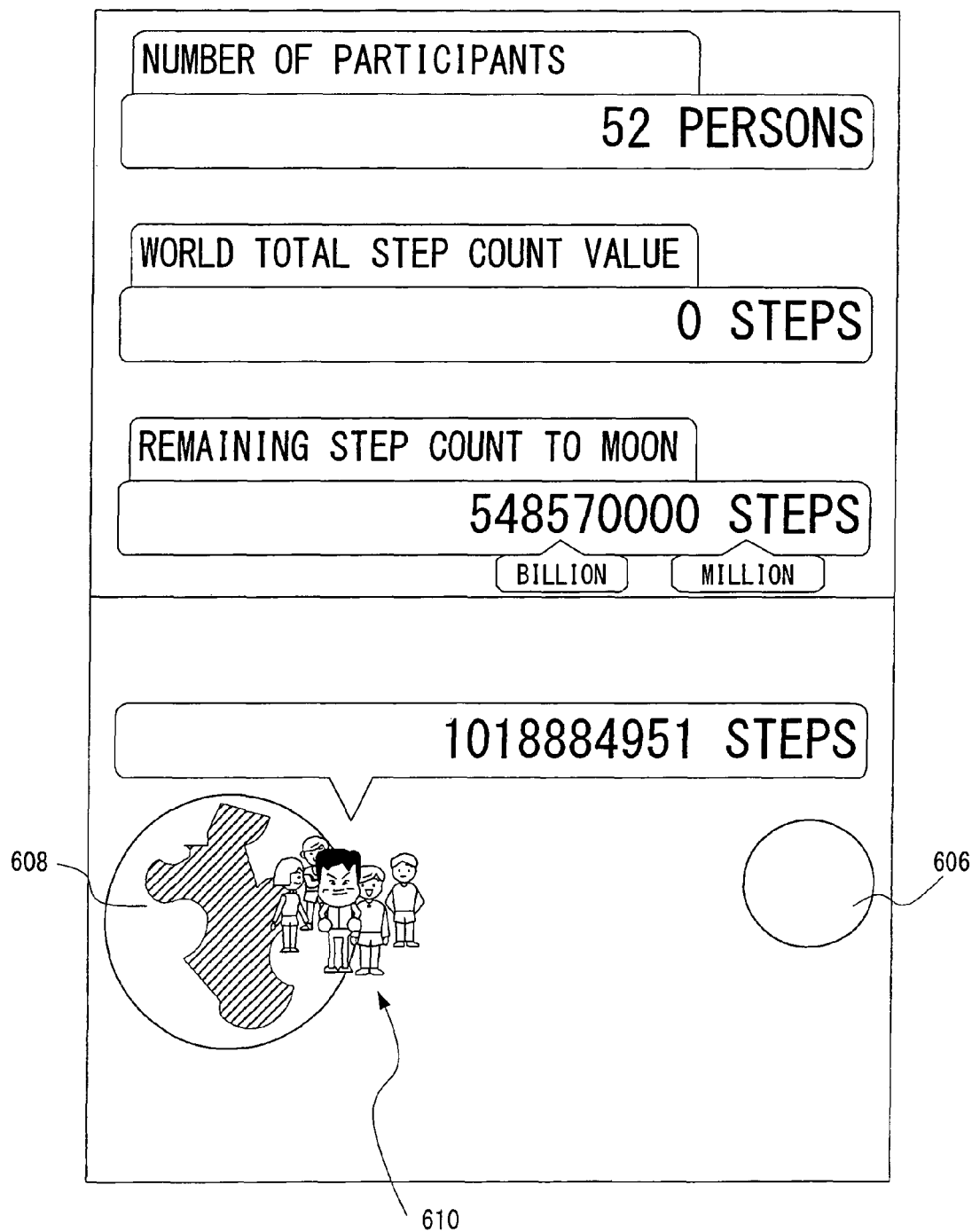
FIG. 20 is an illustrative view showing one example of a screen representing a world total.

Then, in a step S111 the CPU core 34 updates the world total and the number of participants. More specifically, the CPU core 34 updates the world total stored in the memory area 320 and the number of participants stored in the data memory area 302 to the world total and the number of participants which are received. In addition, the display of the world total and the number of participants are updated. FIG. 20 shows one example of the screen when the world total is received. On the lower screen, the world total currently received is displayed. The step count on the lower screen is added to the step count by the previous time displayed on the upper screen, and thus, the world total is updated. Furthermore, the display of the number of participants on the upper screen is also updated to the number of participants which is received.

In addition, in a step S113, the CPU core 34 moves the character on the basis of the world total. That is, the character group 610 indicating the users in the world is moved to the position according to the world total. In a case that the world total is above a step count condition (step counts required to the destination), the character group 610 is moved to the object representing the destination 606.

Furthermore, in a step S115, the CPU core 34 calculates the remaining step count on the basis of the world total and the step count condition, and updates the remaining step count in the memory area 324. In a case that the world total is above the step count condition, the remaining step count is set to 0 (zero). In addition, the display of the remaining step count on the upper screen is also updated. Additionally, in another embodiment, the remaining step count may also be calculated in the server 202 and transmitted from the server 202.

Succeedingly, in a step S117, the CPU core 34 downloads an arrival time from the server 202. More specifically, the CPU core 34 transmits a request of the arrival time with respect to the destination to the server 202, and receives the information in relation to the arrival transmitted from the server 202 in response thereto.

Figure 21:
FIG. 21 is an illustrative view showing one example of a screen when the user reaches a destination.

Then, in a step S119, the CPU core 34 determines whether or not an arrival time is received. If it is determined that the world total satisfies the step count condition of the destination in the server 202, the information indicating the arrival time is transmitted to the game apparatus 10. If "YES" in the step S119, that is, if the world total satisfies the step count condition of the destination, the CPU core 34 makes a display of the arrival in a step S121. FIG. 21 shows one example of a screen on which the arrival at the destination is displayed. On the upper screen, the arrival at the destination and the arrival time (the number of days taken from the start of the game to the arrival at the destination) are displayed. Furthermore, on the lower screen, an image showing that the character 512 corresponding to the received ID exists together with the other characters is displayed.

Succeedingly, in a step S123, the CPU core 34 sets a next planet as a destination, and updates the destination of the memory area 322. It should be noted that the route of this space travel game is decided in advance and stored, and a next destination is selected from the route.

Then, in a step S125, the CPU core 34 updates the remaining step count. From the step count condition of the new destination and the world total, the remaining step count to the destination is calculated, and the remaining step count of the memory area 324 is updated therewith. After completion of the step S125, the process returns to the step S103. The screens shown in FIG. 19 are displayed, that is, on the upper screen, the remaining step count to the destination is displayed, and on the lower screen, the object representing the destination 606 and the position of the character group 610 are updated. On the other hand, if "NO" in the step S119, that is, if not an arrival time but non-arrival information is received, the process returns to the step S103.

Furthermore, an operation of the server 202 is shown in FIG. 18. The CPU of the server 202 determines whether or not a total value of the step counts is received from the game apparatus 10 in a step S131 in FIG. 18. If "YES" in the step S131, the CPU of the server 202 accumulates the step counts of the user in a step S133. More specifically, since the total value of the step counts corresponding to the ID is transmitted from the game apparatus 10, the server 202 reads the accumulated total step count value with the ID from the memory area 410, and adds the received total value thereto to thereby calculate a new accumulated step count value. Then, the accumulated step count value with the Din the memory area 410, is updated. In a case of the received total value with the received ID is firstly received, the received total value of the step counts is stored in the memory area 410 as an accumulated step count value with the ID.

Here, the processing in the step S133 may be performed on the side of the game apparatus 10. That is, the game apparatus 10 may calculate an accumulated step count value including the total value of the step counts which was transmitted to the server 202 before and transmit it to the server 202. In this case, the server 202 merely rewrites the accumulated step count value in the memory area 410 to the total of the step counts (accumulated count value) received from the game apparatus 10.

If the step S133 is completed, or if "NO" in the step S131, the CPU of the server 202 determines whether or not a totalization timing has come in a step S135. The totalization timing is appropriately set to a time when a preset time has elapsed from the previous totalization, when a predetermine time has come, when the total value of the step counts is received or the like.

If "YES" in the step S135, the CPU of the server 202 calculates a world total (world total of the step counts) and the number of participants in a step S137. More specifically, the accumulated step count values of all the users stored in the memory area 410 are totalized, and the totalized value is stored in the memory area 414 as a world total. Furthermore, the number of IDs which is stored in the memory area 410 is counted, and the number is stored in the memory area 412 as the number of participants. Here, the number of participants may be counted each time that a new ID is received in the step S131.

In a succeeding step S139, the CPU of the server 202 determines whether or not the destination is reached. More specifically, it is determined whether or not the world total is above the step count condition of the destination. If "YES" in the step S139, the CPU of the server 202 calculates the arrival time and stores the same in a step S141. More specifically, the CPU calculates the number of days taken from the start of the game to the arrival at the destination on the basis of the game start date and time stored in the data memory area 402 and the current date and time acquired from the time circuit, and stores the same in the memory area 418 as an arrival time.

In addition, it is determined whether or not the CPU of the server 202 updates the destination of the memory area 416 in a step S143. As described above, the route of the space travel game is set in advance, and on the basis of the route, the next planet is set as a destination.

If the step S143 is completed, or if "NO" in the step S135 or S139, the CPU of the server 202 determines whether or not a request of the world total is received from the game apparatus 10 in a step S145. If "YES" in the step S145, the CPU of the server 202 respectively reads the world total and the number of participants from the memory areas 414 and 412 in a step S147, and then transmits the same to the game apparatus 10.

If the step S147 is completed, or if "NO" in the step S145, the CPU of the server 202 determines whether or not a request of the arrival time is received from the game apparatus 10 in a step S149. If "YES" in the step S149, the CPU determines whether or not an arrival time with respect to the destination is stored with reference to the data in the memory area 418 in a step S151.

If "YES" in the step S1 51, that is, if the destination is reached, the CPU reads the arrival time from the memory area 418 and transmits the same to the game apparatus 10 in a step S153. On the other hand, if "NO" in the step S151, that is, if the destination has not been reached, the CPU transmits the information (non-arrival information) indicating that the destination has not been reached to the game apparatus 10 in a step S155. If the step S153 or the S155 is completed, or if "NO" in the step S149, the process returns to the step S131.

According to this embodiment, a predetermined arithmetic operation is performed by utilizing a plurality of step count data counted in a plurality of pedometers 100, the result of the arithmetic operation is reflected on the game, and therefore, it is possible to execute a game utilizing a plurality of pedometers 100. In addition, it is possible provide a way of enjoyment of progressing the game in cooperation with all the persons by walking together with all the persons at the same time, and by walking together with all the persons a lot, and therefore, it is possible to improve interest of the game by utilizing the step count unlike a game for merely competing the accumulated step counts.

Additionally, in the space travel game of the above-described embodiment, a totalized value of the accumulated step count values of the plurality of users of the plurality of game apparatuses 10 is calculated in the server 202, and the game is performed on the basis of the result of the arithmetic operation. However, in another embodiment, the accumulated step count values of the plurality of users are totalized in one game apparatus 10, and the game may be performed on the basis of the totalized value. As one example, a raising or rearing game as shown in FIG. 22 is presented.

In this raising game, when the step count data is acquired, a tree (object) 700 is grown on the basis of the totalized value of the accumulated step count values of the plurality of users of the game apparatuses 10. The totalization of the step counts of the plurality of users can be confirmed by the growth of the tree 700.

More specifically, on the lower screen, a plurality of characters 512 corresponding to a plurality of users who participate in this raising game are displayed. Here, the characters 512 are a father, a mother, a brother, a sister, that is, this raising game is played by family members.

The tree 700 is planted in a ground 702 on the lower screen. The tree 700 grows as the plurality of users walk, and is also displayed on the upper screen when it grows higher upward. That is, the height of the tree 700 is controlled by the totalized value of the accumulated step count values of the plurality of users. Furthermore, on the upper screen, a goal to be achieved by the tree 700 and the distance (height) are displayed, and the current accumulated step counts of the plurality of users and a distance calculated from the step count by a predetermined conversion coefficient are displayed. Furthermore, if the distance reaches the goal distance, that is, if the height of the tree 700 reaches the goal, a next goal is set from the route decided in advance similar to the space travel game.

Figure 23:
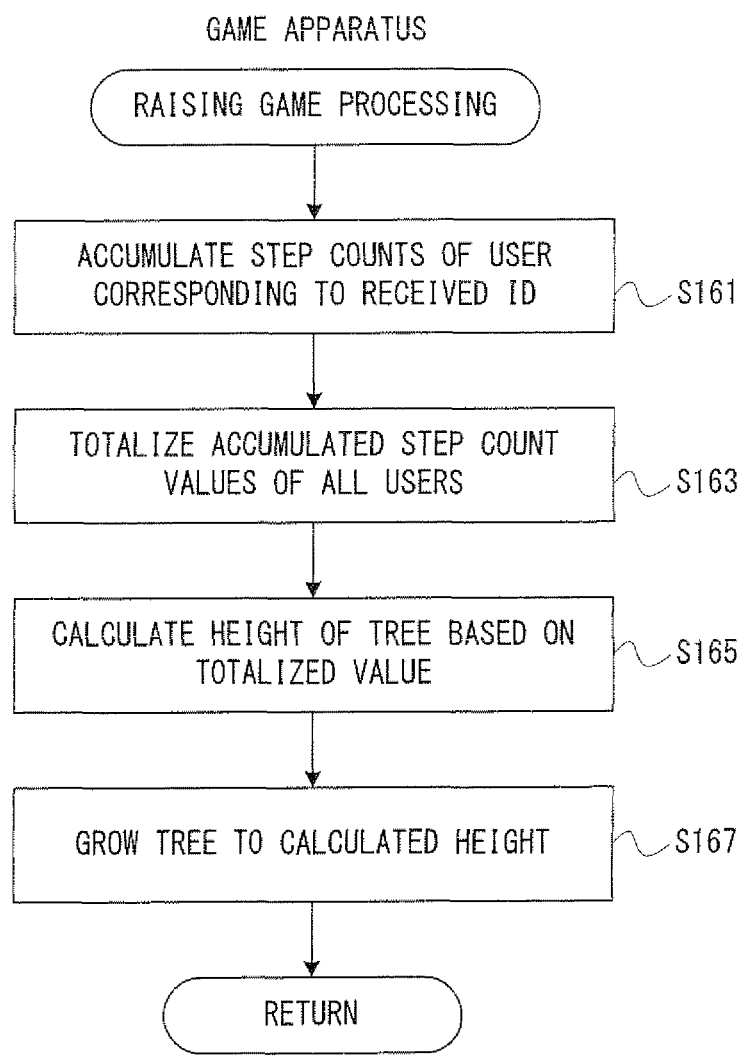
FIG. 23 is a flowchart showing one example of an operation of the raising game processing.

FIG. 23 shows one example of an operation of the raising game processing to be executed in the game apparatus 10. It should be noted that the raising game is executed in response to the selection on the main menu similar to the above-described electric power generation game and the space travel game.

When the raising game processing is started, the CPU core 34 accumulates the step counts of the user corresponding to the received ID in a step S161. The accumulated step count value is stored in the data memory area 302 by being brought into correspondence to the ID.

Next, in a step S163, the CPU core 34 totalizes the accumulated step count values of all the users. The totalized value is stored in the data memory area 302.

In a succeeding step S165, the CPU core 34 calculates the height of the tree 700 on the basis of the totalized value. The height of the tree 700 is stored in the data memory area 302.

Then, in a step S167, the CPU core 34 displays an image in which the tree 700 grows to the calculated height. Thus, a scene in which the tree 700 grows to the calculated height upward is displayed.

It should be noted that in each of the above-described embodiments, a predetermined arithmetic operation is executed by utilizing a plurality of step count data respectively calculated by a plurality of pedometers 100, and on the basis of the result of the arithmetic operation, the game processing is executed. The result of the arithmetic operation utilizing such a plurality of step count data can be utilized in various game processing. For example, a control of the parameters of the various objects, such as the motion of the character 512, the brightness and color of the bulb object 516, the position of the character group 610, the height of the tree 700, etc. may be performed on the basis of the result of the arithmetic operation as described above. Furthermore, in correspondence to the result of the arithmetic operation, the item may be acquired or not may be acquired. Furthermore, in correspondence to the result of the arithmetic operation, a map may be changed, such as appearance of a dungeon and another field in the game world.

In addition, in the electric power generation game of the above-described embodiment, a game is executed by calculating scores on the basis of the time during when a plurality of users walk in one game apparatus 10, but in another embodiment, on the basis of the time during which a plurality of users of a plurality of game apparatuses 10 walk, a score may be calculated in the server 202. Thus requires walking with an unknown person living far away in the same time slot, and therefore, it is possible to further enhance the interest of the game. Additionally, not only competing the accumulated step count, but also making a walking time slot coincident with the time slot of a plurality of ordinary people is aimed, and therefore, it is possible to expect an advantage of pleasantly, comfortably, and healthfully walking the persons with persistence.

Although the present invention has been described and illustrated in detail, it is clearly understood that the same is by way of illustration and example only and is not to be taken by way of limitation, the spirit and scope of the present invention being limited only by the terns of the appended claims.

What is claimed is:

1. A game system including one or more processors and a plurality of pedometers each counting a step number, wherein said one or more processors comprising:

a step count data acquiring unit for acquiring, through communication, a plurality of step count data which are respectively counted by said plurality of pedometers;

an arithmetic operation unit for performing a predetermined arithmetic operation by utilizing said plurality of step count data; and a game processing unit for reflecting the result of the arithmetic operation by said arithmetic operation unit on a game, wherein said one or more processors includes a plurality of game apparatuses and a server, said arithmetic operation unit is provided in said server, said game apparatus includes a first transmitting unit for transmitting the step count data acquired from at least one pedometer to said server and a first receiving unit for receiving the result of the arithmetic operation from said server, and said server includes a second receiving unit for receiving said step count data from each of the game apparatuses, and a second transmitting unit for transmitting the result of the arithmetic operation by said arithmetic operation unit to each of the game apparatuses.

2. The game system according to claim 1, wherein a step count value per unit of time is recorded in said step count data, said arithmetic operation unit calculates a different value depending on the number of step count data each recording one or more step count values in the same time slot, and said game processing unit executes game processing on the basis of said calculated value.

3. The game system according to claim 1, wherein said arithmetic operation unit totalizes accumulated step count values of said plurality of pedometers, and said game processing unit executes game processing on the basis of said totalized value.

4. The game system according to claim 3, wherein one or more game effects performed during execution of the game processing correlate to said totalized value.

5. The game system according to claim 1, wherein said game processing unit changes a parameters of an object depending on the result of the arithmetic operation by said arithmetic operation unit.

6. The game system according to claim 1, wherein the plurality of step count data is directly output from said plurality of pedometers, and the step count data is collected directly from the pedometers and used in performing the predetermined arithmetic operation.

7. A game apparatus to be utilized in a game system including a plurality of pedometers each counting a step number and a server for performing a predetermined arithmetic operation by utilizing a plurality of step count data, comprising:

a step count data acquiring unit for acquiring, through communication, step count data counted by at least one pedometer;

a first transmitting unit for transmitting said step count data to said server;

a first receiving unit for receiving from said server the result of the operation of said predetermined arithmetic operation by utilizing said plurality of step count data; and a game processing unit for reflecting said result of operation on the game, wherein said game system includes a plurality of game apparatuses, an arithmetic operation unit is provided in said server for performing the predetermined arithmetic operation, and said server includes a second receiving unit for receiving said step count data from each of the game apparatuses, and a second transmitting unit for transmitting the result of the arithmetic operation by said arithmetic operation unit to each of the game apparatuses.

* * * * *